US005699485A

United States Patent [19]

Shoham

[11] Patent Number: 5,699,485

[45] Date of Patent: Dec. 16, 1997

[54] PITCH DELAY MODIFICATION DURING FRAME ERASURES

[75] Inventor: Yair Shoham, Watchung, N.J.

[73] Assignee: Lucent Technologies Inc., Murray Hill, N.J.

[21] Appl. No.: 482,709

[22] Filed: Jun. 7, 1995

[51] Int. Cl.[6] .................... G10L 9/14; H04B 1/10

[52] U.S. Cl. .................... 395/2.32; 395/2.28; 395/2.29; 395/2.31; 371/31; 341/94

[58] Field of Search .................... 395/2.28, 2.29, 395/2.3, 2.31, 2.32; 371/31; 341/94

[56] References Cited

U.S. PATENT DOCUMENTS

| | | | |
|---|---|---|---|
| 5,305,332 | 4/1994 | Ozawa | 371/31 |
| 5,550,543 | 8/1996 | Chen et al. | 341/94 |

OTHER PUBLICATIONS

Brian Bryden, Gerald E. Seguin, Jean Conan, Vijay K. Bhargava, and Andre Brind'Amour, "Error Correction/ Masking for Digital Voice Transmission Over the Land Mobile Satellite System", IEEE Transactions on Communication, vol. 37, No. 3, pp. 309–314, Mar. 1989.

*Primary Examiner*—Allen R. MacDonald
*Assistant Examiner*—Tālivaldis Ivars Smits
*Attorney, Agent, or Firm*—Thomas A. Restaino; Kenneth M. Brown

[57] ABSTRACT

In a speech decoder which experiences frame erasure, the pitch delay associated with the first of consecutive erased frames is incremented. The incremented value is used as the pitch delay for the second of consecutive erased frames. Pitch delay associated with the first of consecutive erased frames may correspond to the last correctly received pitch delay information from a speech encoder (associated with a non-erased frame), or it may itself be the result of an increment added to a still previous value of pitch delay (associated with a still previous erased frame).

5 Claims, 4 Drawing Sheets

PITCH DELAY MODIFICATION DURING FRAME ERASURES

CROSS-REFERENCE TO RELATED APPLICATION

This application is related to Application Ser. No. 08/482/715, entitled "Adaptive Codebook-Based Speech Compression System," filed on even date herewith, which is incorporated by reference as if set forth fully herein.

FIELD OF THE INVENTION

The present invention relates generally to speech coding arrangements for use in communication systems, and more particularly to the ways in which such speech coders function in the event of burst-like errors in transmission.

BACKGROUND OF THE INVENTION

Many communication systems, such as cellular telephone and personal communications systems, rely on wireless channels to communicate information. In the course of communicating such information, wireless communication channels can suffer from several sources of error, such as multipath fading. These error sources can cause, among other things, the problem of *frame erasure*. *Erasure* refers to the total loss or whole or partial corruption of a set of bits communicated to a receiver. A *frame* is a predetermined fixed number of bits which may be communicated as a block through a communication channel. A frame may therefore represent a time-segment of a speech signal.

If a frame of bits is totally lost, then the receiver has no bits to interpret. Under such circumstances, the receiver may produce a meaningless result. If a frame of received bits is corrupted and therefore unreliable, the receiver may produce a severely distorted result. In either case, the frame of bits may be thought of as "erased" in that the frame is unavailable or unusable by the receiver.

As the demand for wireless system capacity has increased, a need has arisen to make the best use of available wireless system bandwidth. One way to enhance the efficient use of system bandwidth is to employ a signal compression technique. For wireless systems which carry speech signals, speech compression (or *speech coding*) techniques may be employed for this purpose. Such speech coding techniques include analysis-by-synthesis speech coders, such as the well-known Code-Excited Linear Prediction (or CELP) speech coder.

The problem of packet loss in packet-switched networks employing speech coding arrangements is very similar to frame erasure in the wireless context. That is, due to packet loss, a speech decoder may either fail to receive a frame or receive a frame having a significant number of missing bits. In either case, the speech decoder is presented with the same essential problem—the need to synthesize speech despite the loss of compressed speech information. Both "frame erasure" and "packet loss" concern a communication channel (or network) problem which causes the loss of transmitted bits. For purposes of this description, the term "frame erasure" may be deemed to include "packet loss."

Among other things, CELP speech coders employ a codebook of *excitation signals* to encode an original speech signal. These excitation signals, scaled by an excitation gain, are used to "excite" filters which synthesize a speech signal (or some precursor to a speech signal) in response to the excitation. The synthesized speech signal is compared to the original speech signal. The codebook excitation signal is identified which yields a synthesized speech signal which most closely matches the original signal. The identified excitation signal's *codebook index* and *gain* representation (which is often itself a gain codebook index) are then communicated to a CELP decoder (depending upon the type of CELP system, other types of information, such as linear prediction (LPC) filter coefficients, may be communicated as well). The decoder contains codebooks identical to those of the CELP coder. The decoder uses the transmitted indices to select an excitation signal and gain value. This selected scaled excitation signal is used to excite the decoder's LPC filter. Thus excited, the LPC filter of the decoder generates a decoded (or quantized) speech signal—the same speech signal which was previously determined to be closest to the original speech signal.

Some CELP systems also employ other components, such as a *periodicity model* (e.g., a *pitch-predictive filter* or an *adaptive codebook*). Such a model simulates the periodicity of voiced speech. In such CELP systems, parameters relating to these components must also be sent to the decoder. In the case of an adaptive codebook, signals representing a *pitch-period* (*delay*) and adaptive codebook gain must also be sent to the decoder so that the decoder can recreate the operation of the adaptive codebook in the speech synthesis process.

Wireless and other systems which employ speech coders may be more sensitive to the problem of frame erasure than those systems which do not compress speech. This sensitivity is due to the reduced redundancy of coded speech (compared to uncoded speech) making the possible loss of each transmitted bit more significant. In the context of a CELP speech coders experiencing frame erasure, excitation signal codebook indices and other signals representing speech in the frame may be either lost or substantially corrupted preventing proper synthesis of speech at the decoder. For example, because of the erased frame(s), the CELP decoder will not be able to reliably identify which entry in its codebook should be used to synthesize speech. As a result, speech coding system performance may degrade significantly.

Because frame erasure causes the loss of excitation signal codebook indicies, LPC coefficients, adaptive codebook delay information, and adaptive and fixed codebook gain information, normal techniques for synthesizing an excitation signal in a speech decoder are ineffective. Therefore, these normal techniques must be replaced by alternative measures.

SUMMARY OF THE INVENTION

The present invention addresses the problem of the lack of codebook gain information during frame erasure. In accordance with the present invention, a codebook-based speech decoder which fails to receive reliably at least a portion of a current frame of compressed speech information uses a codebook gain which is an attenuated version of a gain from a previous frame of speech.

An illustrative embodiment of the present invention is a speech decoder which includes a codebook memory and a signal amplifier. The memory and amplifier are use in generating a decoded speech signal based on compressed speech information. The compressed speech information includes a scale-factor for use by the amplifier in scaling a codebook vector. When a frame erasure occurs, a scale-factor corresponding to a previous frame of speech is attenuated and the attenuated scale factor is used to amplify the codebook vector corresponding to the current erased frame of speech. Specific details of an embodiment of the present invention are presented in section II.D. of the Detailed Description set forth below.

The present invention is applicable to both fixed and adaptive codebook processing, and also to systems which insert decoder systems or other elements (such as a pitch-predictive filter) between a codebook and its amplifier. See section II.B.1 of the Detailed Description for a discussion relating to the present invention.

DETAILED DESCRIPTION

I. Introduction

Figure 1:
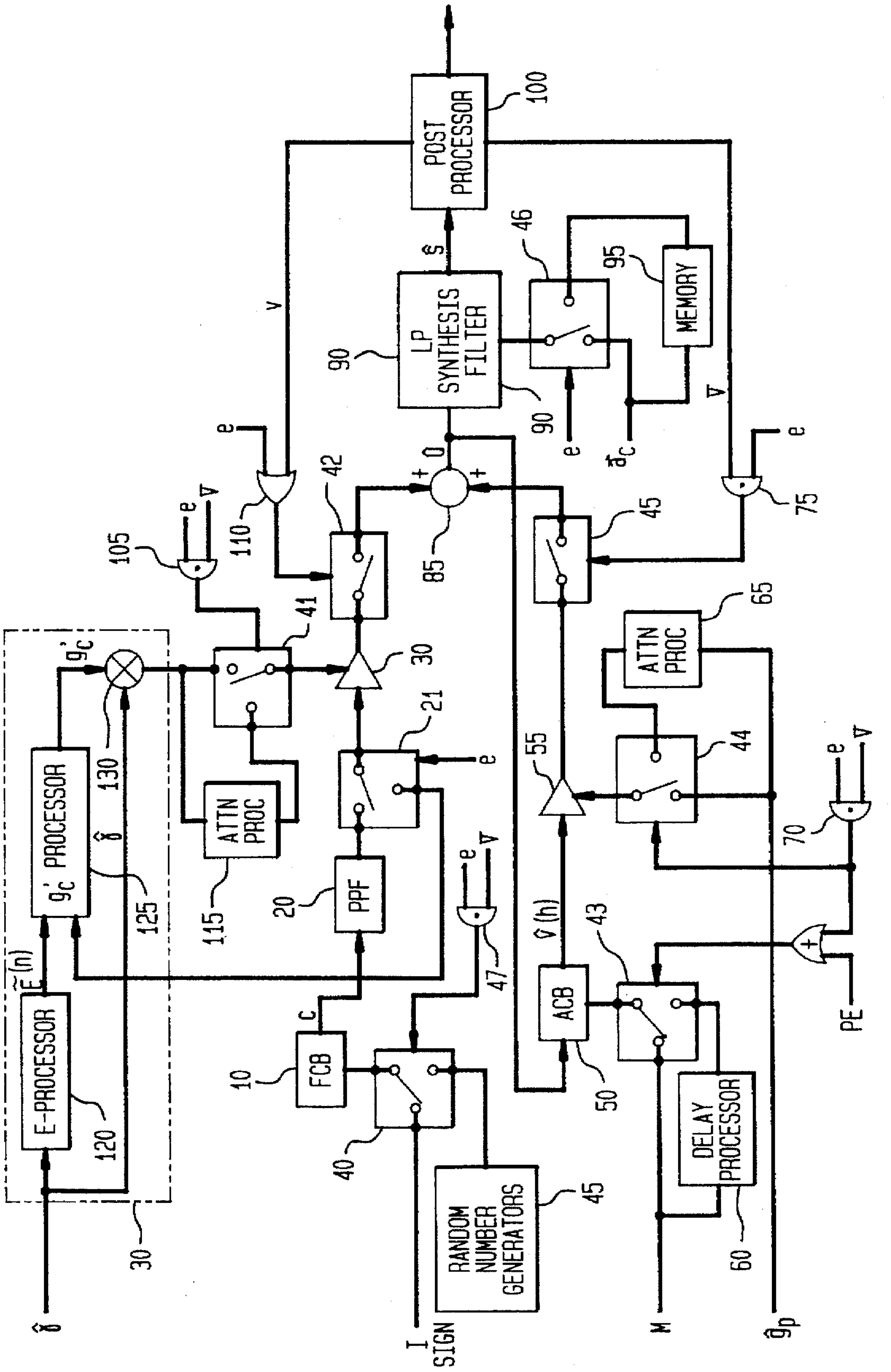
FIG. 1 presents a block diagram of a G.729 Draft decoder modified in accordance with the present invention.

The present invention concerns the operation of a speech coding system experiencing frame erasure—that is, the loss of a group of consecutive bits in the compressed bit-stream, which group is ordinarily used to synthesize speech. The description which follows concerns features of the present invention applied illustratively to an 8 kbit/s CELP speech coding system proposed to the ITU for adoption as its international standard G.729. For the convenience of the reader, a preliminary draft recommendation for the G.729 standard is provided in Section III. Sections III.3 and III.4 include detailed descriptions of the speech encoder and decoder, respectively. The illustrative embodiment of the present invention is directed to modifications of normal G.729 decoder operation, as detailed in G.729 Draft section 4.3. No modifications to the encoder are required to implement the present invention.

The applicability of the present invention to the proposed G.729 standard notwithstanding, those of ordinary skill in the art will appreciate that features of the present invention have applicability to other speech coding systems.

Knowledge of the erasure of one or more frames is an input signal, e, to the illustrative embodiment of the present invention. Such knowledge may be obtained in any of the conventional ways well-known in the art. For example, whole or partially corrupted frames may be detected through the use of a conventional error detection code. When a frame is determined to have been erased, e=1 and special procedures are initiated as described below. Otherwise, if not erased (e=0) normal procedures are used. Conventional error protection codes could be implemented as part of a conventional radio transmission/reception subsystem of a wireless communication system.

In addition to the application of the full set of remedial measures applied as the result of an erasure (e=1), the decoder employs a subset of these measures when a parity error is detected. A parity bit is computed based on the pitch delay index of the first of two subframes of a frame of coded speech. See Subsection III.3.7.1. This parity bit is computed by the decoder and checked against the parity bit received from the encoder. If the two parity bits are not the same, the delay index is said to be corrupted (PE=1, in the embodiment) and special processing of the pitch delay is invoked.

For clarity of explanation, the illustrative embodiment of the present invention is presented as comprising individual functional blocks. The functions these blocks represent may be provided through the use of either shared or dedicated hardware, including, but not limited to, hardware capable of executing software. For example, the blocks presented in FIG. 1 may be provided by a single shared processor. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

II. An Illustrative Embodiment

Figure 5:
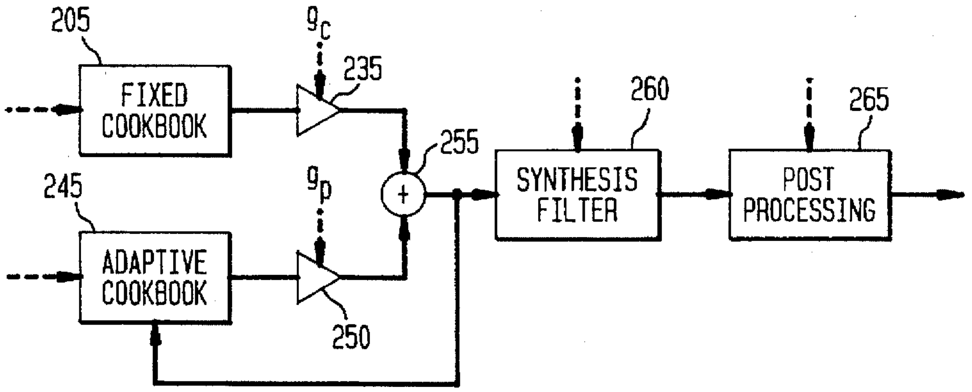
FIG. 5 presents the signal flow at the G.729 CS-ACELP encoder.

FIG. 1 presents a block diagram of a G.729 Draft decoder modified in accordance with the present invention (FIG. 1 is a version of FIG. 5 (showing the signal flow at the G.729 CS-ACELP encoder) that has been augmented to more clearly illustrate features of the claimed invention). In normal operation (i.e., without experiencing frame erasure) the decoder operates in accordance with the description provided in Subsections III.4.1–III.4.2. During frame erasure, the operation of the embodiment of FIG. 1 is augmented by special processing to make up for the erasure of information from the encoder.

A. Normal Decoder Operation

The encoder described in Section III provides a frame of data representing compressed speech every 10 ms. The frame comprises 80 bits and is detailed in Tables 1 and 9 of Section III. Each 80-bit frame of compressed speech is sent over a communication channel to a decoder which synthesizes a speech (representing two subframes) signals based on the frame produced by the encoder. The channel over which the frames are communicated (not shown) may be of any type (such as conventional telephone networks, packet-based networks, cellular or wireless networks, ATM networks, etc.) and/or may comprise a storage medium (such as magnetic storage, semiconductor RAM or ROM, optical storage such as CD-ROM, etc.).

The illustrative decoder of FIG. 1 includes both an adaptive codebook (ACB) portion and a fixed codebook (FCB) portion. The ACB portion includes ACB 50 and a gain amplifier 55. The FCB portion includes a FCB 10, a pitch predictive filter (PPF) 20, and gain amplifier 30. The decoder decodes transmitted parameters (see Section III.4.1) and performs synthesis to obtain reconstructed speech.

The FCB 10 operates in response to an index, I, sent by the encoder. Index I is received through switch 40. The FCB 10 generates a vector, c(n), of length equal to a subframe. See Section III.4.1.2. This vector is applied to the PPF 20. PPF 20 operates to yield a vector for application to the FCB gain amplifier 30. See Sections III.3.8 and III.4.1.3. The amplifier, which applies a gain, $\hat{g}_c$, from the channel, generates a scaled version of the vector produced by the PPF 20. See Section III.4.1.3. The output signal of the amplifier 30 is supplied to summer 85 (through switch 42).

The gain applied to the vector produced by PPF 20 is determined based on information provided by the encoder.

This information is communicated as codebook indices. The decoder receives these indicies and synthesizes a gain correction factor, $\hat{\gamma}$. See Section III.4.1.4. This gain correction factor, $\hat{\gamma}$, is supplied to code vector prediction energy (E-) processor 120. E-processor 120 determines a value of the code vector predicted error energy, $\hat{R}$, in accordance with the following expression:

$$\hat{R}^{(n)}=20 \log \hat{\gamma}[dB]$$

The value of $\hat{R}$ is stored in a processor buffer which holds the five most recent (successive) values of $\hat{R}$. $\hat{R}^{(n)}$ represents the predicted error energy of the fixed code vector at subframe n. The predicted mean-removed energy of the codevector is formed as a weighted sum of past values of $\hat{R}$:

$$\tilde{E}^{(n)} = \sum_{i=1}^{4} b_i \hat{R}^{(n-i)},$$

where b=[0.68 0.58 0.34 0.19] and where the past values of $\hat{R}$ are obtained from the buffer. This predicted energy is then output from processor 120 to a predicted gain processor 125.

Processor 125 determines the actual energy of the code vector supplied by codebook 10. This is done according to the following expression:

$$E = 10 \log\left(\frac{1}{40}\sum_{i=0}^{39} c_i^2\right),$$

where i indexes the samples of the vector. The predicted gain is then computed as follows:

$$g'_c=10^{(\tilde{E}^{(n)}+\bar{E}-E)/20},$$

where $\bar{E}$ is the mean energy of the FCB (e.g., 30 dB)

Finally, the actual scale factor (or gain) is computed by multiplying the received gain correction factor, $\gamma$ by the predicted gain, $g'_c$ at multiplier 130. This value is then supplied to amplifier 30 to scale the fixed codebook contribution provided by PPF 20.

Also provided to the summer 85 is the output signal generated by the ACB portion of the decoder. The ACB portion comprises the ACB 50 which generates a excitation signal, v(n), of length equal to a subframe based on past excitation signals and the ACB pitch-period, M, received (through switch 43) from encoder via the channel. See Subsection III.4.1.1. This vector is scaled by amplifier 250 based on gain factor, $\hat{g}_p$, received over the channel. This scaled vector is the output of the ACB portion.

Summer 85 generates an excitation signal, u(n), in response to signals from the FCB and ACB portions of the decoder. The excitation signal, u(n), is applied to an LPC synthesis filter 90 which synthesizes a speech signal based on LPC coefficients, $a_i$, received over the channel. See Subsection III.4.1.6.

Finally, the output of the LPC synthesis filter 90 is supplied to a post processor 100 which performs adaptive postfiltering (see Subsections III.4.2.1–III.4.2.4, high-pass filtering (see Subsections III.4.2.5), and up-scaling (see Subsections III.4.2.5).

B. Excitation Signal Synthesis During Frame Erasure

In the presence of frame erasures, the decoder of FIG. 1 does not receive reliable information (if it receives anything at all) from which an excitation signal, u(n), may be synthesized. As such, the decoder will not know which vector of signal samples should be extracted from codebook 10, or what is the proper delay value to use for the adaptive codebook 50. In this case, the decoder must obtain a *substitute* excitation signal for use in synthesizing a speech signal. The generation of a substitute excitation signal during periods of frame erasure is dependent on whether the erased frame is classified as *voiced* (periodic) or *unvoiced* (aperiodic). An indication of periodicity for the erased frame is obtained from the post processor 100, which classifies each properly received frame as periodic or aperiodic. See Subsection III.4.2.1. The erased frame is taken to have the same periodicity classification as the previous frame processed by the postfilter. The binary signal representing periodicity, v, is determined according to postfilter variable $g_{pit}$. Signal v=1 if $g_{pit}>0$; else, v=0. As such, for example, if the last good frame was classified as periodic, v=1; otherwise v=0.

1. Erasure of Frames Representing Periodic Speech

For an erased frame (e=1) which is thought to have represented speech which is periodic (v=1), the contribution of the fixed codebook is set to zero. This is accomplished by switch 42 which switches states (in the direction of the arrow) from its normal (biased) operating position coupling amplifier 30 to summer 85 to a position which decouples the fixed codebook contribution from the excitation signal, u(n). This switching of state is accomplished in accordance with the control signal developed by AND-gate 110 (which tests for the condition that the frame is erased, e=1, and it was a periodic frame, v=1). On the other hand, the contribution of the adaptive codebook is maintained in its normal operating position by switch 45 (since e=1 but not_v=0).

The pitch delay, M, used by the adaptive codebook during an erased frame is determined by delay processor 60. Delay processor 60 stores the most recently received pitch delay from the encoder. This value is overwritten with each successive pitch delay received. For the first erased frame following a "good" (correctly received) frame, delay processor 60 generates a value for M which is equal to the pitch delay of the last good frame (i.e., the previous frame). To avoid excessive periodicity, for each successive erased frame processor 60 increments the value of M by one (1). The processor 60 restricts the value of M to be less than or equal to 143 samples. Switch 43 effects the application of the pitch delay from processor 60 to adaptive codebook 50 by changing state from its normal operating position to its "voiced frame erasure" position in response to an indication of an erasure of a voiced frame (since e=1 and v=1).

The adaptive codebook gain is also synthesized in the event of an erasure of a voiced frame in accordance with the procedure discussed below in section C. Note that switch 44 operates identically to switch 43 in that it effects the application of a synthesized adaptive codebook gain by changing state from its normal operating position to its "voiced frame erasure" position.

2. Erasure of Frames Representing Aperiodic Speech

For an erased frame (e=1) which is thought to have represented speech which is aperiodic (v=0), the contribution of the adaptive codebook is set to zero. This is accomplished by switch 45 which switches states (in the direction of the arrow) from its normal (biased) operating position coupling amplifier 55 to summer 85 to a position which decouples the adaptive codebook contribution from the excitation signal, u(n). This switching of state is accomplished in accordance with the control signal developed by AND-gate 75 (which tests for the condition that the frame is erased, e=1, and it was an aperiodic frame, not_v=1). On the other hand, the contribution of the fixed codebook is maintained in its normal operating position by switch 42 (since e=1 but v=0).

The fixed codebook index, I, and codebook vector sign are not available do to the erasure. In order to synthesize a fixed codebook index and sign index from which a codebook vector, c(n), could be determined, a random number generator 45 is used. The output of the random number generator 45 is coupled to the fixed codebook 10 through switch 40. Switch 40 is normally is a state which couples index I and sign information to the fixed codebook. However, gate 47 applies a control signal to the switch which causes the switch to change state when an erasure occurs of an aperiodic frame (e=1 and not_v=1).

The random number generator 45 employs the function:

$$seed=seed*31821+13849$$

to generate the fixed codebook index and sign. The initial seed value for the generator 45 is equal to 21845. For a given coder subframe, the codebook index is the 13 least significant bits of the random number. The random sign is the 4 least significant bits of the *next* random number. Thus the random number generator is run twice for each fixed codebook vector needed. Note that a noise vector could have been generated on a sample-by-sample basis rather than using the random number generator in combination with the FCB.

The fixed codebook gain is also synthesized in the event of an erasure of an aperiodic frame in accordance with the procedure discussed below in section D. Note that switch 41 operates identically to switch 40 in that it effects the application of a synthesized fixed codebook gain by changing state from its normal operating position to its "voiced frame erasure" position.

Since PPF 20 adds periodicity (when delay is less than a subframe), PPF 20 should not be used in the event of an erasure of an aperiodic frame. Therefore switch 21 selects either the output of FCB 10 when e=0 or the output of PPF 20 when e=1.

C. LPC Filter Coefficients for Erased Frames

The excitation signal, u(n), synthesized during an erased frame is applied to the LPC synthesis filter 90. As with other components of the decoder which depend on data from the encoder, the LPC synthesis filter 90 must have substitute LPC coefficients, $a_i$, during erased frames. This is accomplished by repeating the LPC coefficients of the last good frame. LPC coefficients received from the encoder in a non-erased frame are stored by memory 95. Newly received LPC coefficients overwrite previously received coefficients in memory 95. Upon the occurrence of a frame erasure, the coefficients stored in memory 95 are supplied to the LPC synthesis filter via switch 46. Switch 46 is normally biased to couple LPC coefficients received in a good frame to the filter 90. However, in the event of an erased frame (e=1), the switch changes state (in the direction of the arrow) coupling memory 95 to the filter 90.

D. Attenuation of Adaptive and Fixed Codebook Gains

As discussed above, both the adaptive and fixed codebooks 50, 10 have a corresponding gain amplifier 55, 30 which applies a scale factor to the codebook output signal. Ordinarily, the values of the scale factors for these amplifiers is supplied by the encoder. However, in the event of a frame erasure, the scale factor information is not available from the encoder. Therefore, the scale factor information must be synthesized.

For both the fixed and adaptive codebogks, the synthesis of the scale factor is accomplished by attenuation processors 65 and 115 which scale (or attenuate) the value of the scale factor used in the previous subframe. Thus, in the case of a frame erasure following a good frame, the value of the scale factor of the first subframe of the erased frame for use by the amplifier is the second scale factor from the good frame multiplied by an attenuation factor. In the case of successive erased subframes, the later erased subframe (subframe n) uses the value of the scale factor from the former erased subframe (subframe n−1) multiplied by the attenuation factor. This technique is used no matter how many successive erased frames (and subframes) occur. Attenuation processors 65, 115 store each new scale factor, whether received in a good frame or synthesized for an erased frame, in the event that the next subframe will be en erased subframe.

Specifically, attenuation processor 115 synthesizes the fixed codebook gain, $g_c$, for erased subframe n in accordance with:

$$g_c^{(n)}=0.98\ g_c^{(n-1)}.$$

Attenuation processor 65 synthesizes the adaptive codebook gain, $g_p$, for erased subframe n in accordance with:

$$g_p^{(n)}=0.9\ g_p^{(n-1)}.$$

In addition, processor 65 limits (or clips) the value of the synthesized gain to be less than 0.9. The process of attenuating gains is performed to avoid undesired perceptual effects.

E. Attenuation of Gain Predictor Memory

As discussed above, there is a buffer which forms part of E-Processor 120 which stores the five most recent values of the prediction error energy. This buffer is used to predict a value for the predicted energy of the code vector from the fixed codebook.

However, due to frame erasure, there will be no information communicated to the decoder from the encoder from which new values of the prediction error energy. Therefore, such values will have to be synthesized. This synthesis is accomplished by E-processor 120 according to the following expression:

$$\hat{R}^{(n)}=\left(0.25\sum_{i=1}^{4}\hat{R}^{(n)}\right)-4.0.$$

Thus, a new value for $\hat{R}^{(n)}$ is computed as the average of the four previous values of $\hat{R}$ less 4 dB. The attenuation of the value of $\hat{R}$ is performed so as to ensure that once a good frame is received undesirable speech distortion is not created. The value of the synthesized R is limited not to fall below −14 dB.

F. An Illustrative Wireless System

Figure 2:
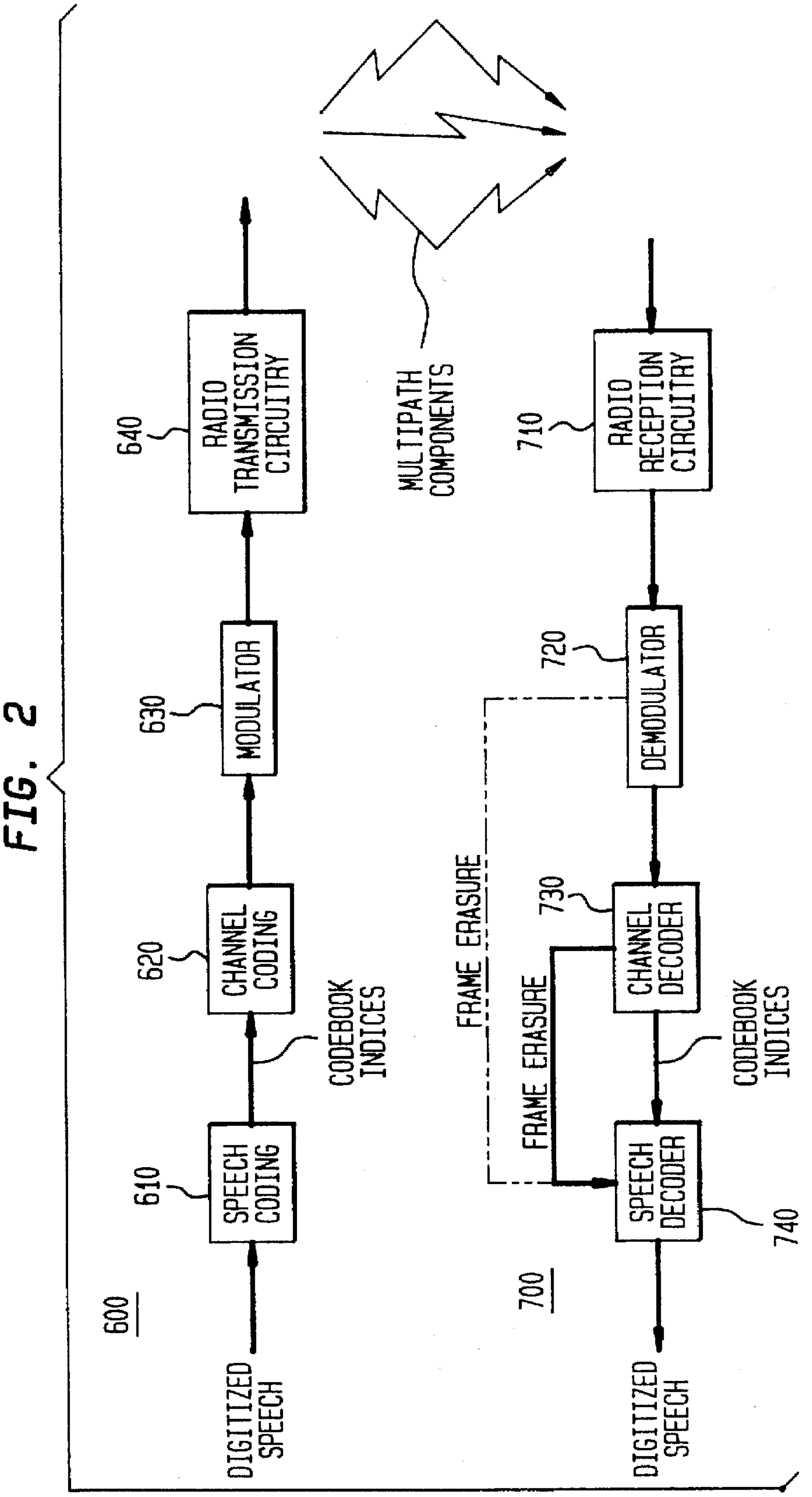
FIG. 2 presents an illustrative wireless communication system employing the embodiment of the present invention presented in FIG. 1.

As stated above, the present invention has application to wireless speech communication systems. FIG. 2 presents an illustrative wireless communication system employing an embodiment of the present invention. FIG. 2 includes a transmitter 600 and a receiver 700. An illustrative embodiment of the transmitter 600 is a wireless base station. An illustrative embodiment of the receiver 700 is a mobile user terminal, such as a cellular or wireless telephone, or other personal communications system device. (Naturally, a wireless base station and user terminal may also include receiver and transmitter circuitry, respectively.) The transmitter 600 includes a speech coder 610, which may be, for example, a coder according to Section III. The transmitter further includes a conventional channel coder 620 to provide error detection (or detection and correction) capability; a conventional modulator 630; and conventional radio transmission circuitry; all well known in the art. Radio signals transmitted by transmitter 600 are received by receiver 700 through a transmission channel. Due to, for example, possible destructive interference of various multipath components of the transmitted signal, receiver 700 may be in a deep fade preventing the clear reception of transmitted bits. Under such circumstances, frame erasure may occur.

Receiver 700 includes conventional radio receiver circuitry 710, conventional demodulator 720, channel decoder 730, and a speech decoder 740 in accordance with the present invention. Note that the channel decoder generates a frame erasure signal whenever the channel decoder determines the presence of a substantial number of bit errors (or unreceived bits). Alternatively (or in addition to a frame erasure signal from the channel decoder), demodulator 720 may provide a frame erasure signal to the decoder 740.

G. Discussion

Although specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

In addition, although the illustrative embodiment of present invention refers to codebook "amplifiers," it will be understood by those of ordinary skill in the art that this term encompasses the scaling of digital signals. Moreover, such scaling may be accomplished with scale factors (or gains) which are less than or equal to one (including negative values), as well as greater than one.

The following section of the detailed description contains the G.729 Draft. This document, at the time of the filing of the present application, is intended to be submitted to a standards body of The International Telecommunications Union (ITU), and provides a more complete description of an illustrative 8 kbit/s speech coding system which employs, inter alia, the principles of the present invention.

III.1 INTRODUCTION

This Recommendation contains the description of an algorithm for the coding of speech signals at 8 kbit/s using Conjugate-Structure-Algebraic-Code-Excited Linear-Predictive (CS-ACELP) coding.

This coder is designed to operate with a digital signal obtained by first performing telephone bandwidth filtering (ITU Rec. G.710) of the analog input signal, then sampling it at 8000 Hz, followed by conversion to 16 bit linear PCM for the input to the encoder. The output of the decoder should be converted back to an analog signal by similar means. Other input/output characteristics, such as those specified by ITU Rec. G.711 for 64 kbit/s PCM data, should be converted to 16 bit linear PCM before encoding, or from 16 bit linear PCM to the appropriate format after decoding. The bitstream from the encoder to the decoder is defined within this standard.

This Recommendation is organized as follows: Subsection III.2 gives a general outline of the CS-ACELP algorithm. In Subsections III.3 and III.4, the CS-ACELP encoder and decoder principles are discussed, respectively. Subsection III.5 describes the software that defines this coder in 16 bit fixed point arithmetic.

II.2 GENERAL DESCRIPTION OF THE CODER

The CS-ACELP coder is based on the code-excited linear-predictive (CF, LP) coding model. The coder operates on speech frames of 10 ms corresponding to 80 samples at a sampling rate of 8000 samples/sec. For every 10 msec frame, the speech signal is analyzed to extract the parameters of the CELP model (LP filter coefficients, adaptive and fixed codebook indices and gains). These parameters are encoded and transmitted. The bit allocation of the coder parameters is shown in Table 1. At the decoder, these parameters are used to retrieve the excitation and synthesis filter

TABLE 1

Bit allocation of the 8 kbit/s CS-ACELP algorithm (10 msec frame).

Figure 3:
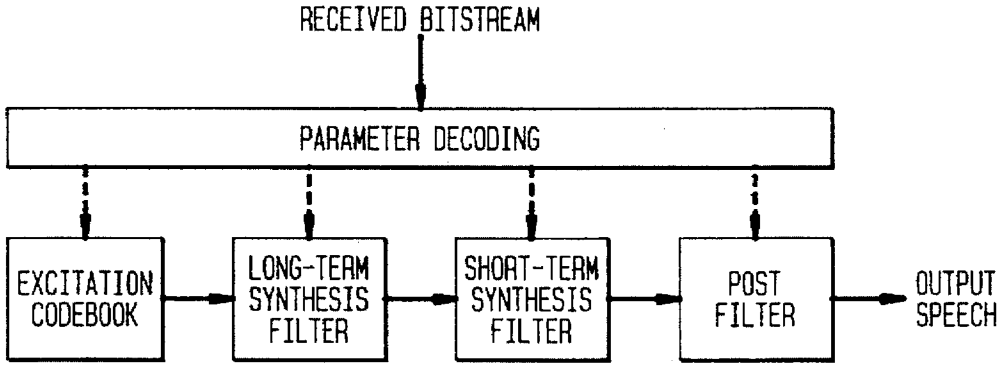
FIG. 3 presents a block diagram of a conceptual G.729 CELP synthesis model.

| Parameter | Codeword | Subframe 1 | Subframe 2 | Total per frame |
|---|---|---|---|---|
| LSP | L0, L1, L2, L3 | | | 18 |
| Adaptive codebook delay | P1, P2 | 8 | 5 | 13 |
| Delay parity | P0 | 1 | | 1 |
| Fixed codebook index | C1, C2 | 13 | 13 | 26 |
| Fixed codebook sign | S1, S2 | 4 | 4 | 8 |
| Codebook gains (stage 1) | GA1, GA2 | 3 | 3 | 6 |
| Codebook gains (stage 2) | GB1, GB2 | 4 | 4 | 8 |
| Total | | | | 80 |

parameters. The speech is reconstructed by filtering this excitation through the LP synthesis filter, as is shown in FIG. 3. The short-term synthesis filter is based on a 10th order linear prediction (LP) filter. The long-term, or pitch synthesis filter is implemented using the so-called adaptive codebook approach for delays less than the subframe length. After computing the reconstructed speech, it is further enhanced by a postfilter.

III.2.1 Encoder

Figure 4:
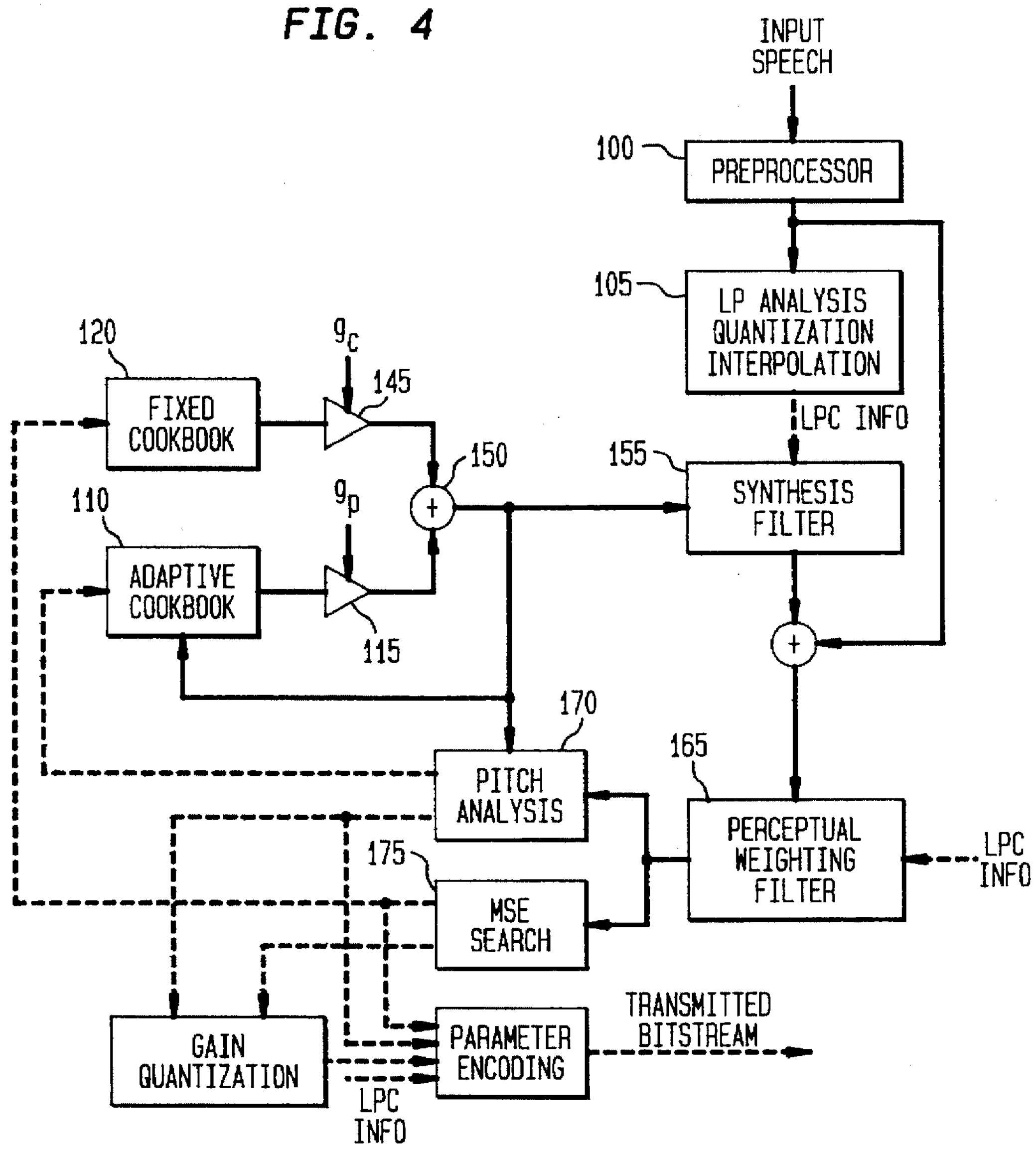
FIG. 4 presents the signal flow at the G.729 CS-ACELP encoder.

The signal flow at the encoder is shown in FIG. 4. The input signal is high-pass filtered and scaled in the pre-processing block. The pre-processed signal serves as the input signal for all subsequent analysis. LP analysis is done once per 10 ms frame to compute the LP filter coefficients. These coefficients are converted to line spectrum pairs (LSP) and quantized using predictive two-stage vector quantization (VQ) with 18 bits. The excitation sequence is chosen by using an analysis-by-synthesis search procedure in which the error between the original and synthesized speech is minimized according to a perceptually weighted distortion measure. This is done by filtering the error signal with a perceptual weighting filter, whose coefficients are derived from the unquantized LP filter. The amount of perceptual weighting is made adaptive to improve the performance for input signals with a flat frequency-response.

The excitation parameters (fixed and adaptive codebook parameters) are determined per subframe of 5 ms (40 samples) each. The quantized and unquantized LP filter coefficients are used for the second subframe, while in the first subframe interpolated LP filter coefficients are used (both quantized and unquantized). An open-loop pitch delay is estimated once per 10 ms frame based on the perceptually weighted speech signal. Then the following operations are repeated for each subframe. The target signal z(n) is computed by filtering the LP residual through the weighted synthesis filter $W(z)/\hat{A}(z)$. The initial states of these filters are updated by filtering the error between LP residual and excitation. This is equivalent to the common approach of subtracting the zero-input response of the weighted synthesis filter from the weighted speech signal. The impulse response, h(n), of the weighted synthesis filter is computed. Closed-loop pitch analysis is then done (to find the adaptive codebook delay and gain), using the target x(n) and impulse response h(n), by searching around the value of the open-loop pitch delay. A fractional pitch delay with ⅓ resolution is used. The pitch delay is encoded with 8 bits in the first subframe and differentially encoded with 5 bits in the second subframe. The target signal x(n) is updated by removing the adaptive codebook contribution (filtered adaptive codevector), and this new target, $x_2(n)$, is used in the fixed algebraic codebook search (to find the optimum excitation). An algebraic codebook with 17 bits is used for the fixed codebook excitation. The gains of the adaptive and fixed codebook are vector quantized with 7 bits, (with MA prediction applied to the fixed codebook gain). Finally, the filter memories are updated using the determined excitation signal.

II.2.2 Decoder

The signal flow at the decoder is shown in FIG. 5. First, the parameters indices are extracted from the received bitstream. These indices are decoded to obtain the coder parameters corresponding to a 10 ms speech frame. These parameters are the LSP coefficients, the 2 fractional pitch delays, the 2 fixed codebook vectors, and the 2 sets of adaptive and fixed codebook gains. The LSP coefficients are interpolated and converted to LP filter coefficients for each subframe. Then, for each 40-sample subframe the following steps are done:

the excitation is constructed by adding the adaptive and fixed codebook vectors scaled by their respective gains, the speech is reconstructed by filtering the excitation through the LP synthesis filter, the reconstructed speech signal is passed through a post-processing stage, which comprises of an adaptive postfilter based on the long-term and short-term synthesis filters, followed by a high-pass filter and scaling operation.

III.2.3 Delay

This coder encodes speech and other audio signals with 10 ms frames. In addition, there is a look-ahead of 5 ms, resulting in a total algorithmic delay of 15 ms. All additional delays in a practical implementation of this coder are due to:

processing time needed for encoding and decoding operations, transmission time on the communication link, multiplexing delay when combining audio data with other data.

III.2.4 Speech Coder Description

The description of the speech coding algorithm of this Recommendation is made in terms of bit-exact, fixed-point mathematical operations. The ANSI C code indicated in Subsection III.5, which constitutes an integral part of this Recommendation, reflects this bit-exact, fixed-point descriptive approach. The mathematical descriptions of the encoder (Subsection III.3), and decoder (Subsection III.4), can be implemented in several other fashions, possibly leading to a codec implementation not complying with this Recommendation. Therefore, the algorithm description of the C code of Subsection III.5 shall take precedence over the mathematical descriptions of Subsections III.3 and III.4 whenever discrepancies are found. A non-exhaustive set of test sequences which can be used in conjunction with the C code are available from the ITU.

III.2.5 Notational Conventions

Throughout this document it is tried to maintain the following notational conventions.

Codebooks are denoted by caligraphic characters (e.g. C).

Time signals are denoted by the symbol and the sample time index between parenthesis (e.g. s(n)). The symbol n is used as sample instant index.

Superscript time indices (e.g $g^{(m)}$) refer to that variable corresponding to subframe m.

Superscripts identify a particular element in a coefficient array.

A identifies a quantized version of a parameter.

Range notations are done using square brackets, where the boundaries are included (e.g. [0.6, 0.9]).

log denotes a logarithm with base 10.

Table 2 lists the most relevant symbols used throughout this document. A glossary of the most relevant signals is given in Table 3. Table 4 summarizes relevant variables and their dimension. Constant parameters are listed in Table 5. The acronyms used in this Recommendation are summarized in Table 6.

TABLE 2

Glossary of symbols.

| Name | Reference | Description |
|---|---|---|
| 1/A(z) | Eq. (2) | LP synthesis filter |
| $H_{h1}(z)$ | Eq. (1) | input high-pass filter |
| $H_p(z)$ | Eq. (77) | pitch postfilter |
| $H_f(z)$ | Eq. (83) | short-term postfilter |
| $H_t(z)$ | Eq. (85) | tilt-compensation filter |
| $H_{h2}(z)$ | Eq. (90) | output high-pass filter |
| P(z) | Eq. (46) | pitch filter |
| W(z) | Eq. (27) | weighting filter |

TABLE 3

Glossary of signals.

| Name | Description |
|---|---|
| h(n) | impulse response of weighting and synthesis filters |
| r(k) | auto-correlation sequence |
| r'(k) | modified auto-correlation sequence |
| R(k) | correlation sequence |
| sw(n) | weighted speech signal |
| s(n) | speech signal |
| s'(n) | windowed speech signal |
| sf(n) | postfiltered output |
| sf'(n) | gain-scaled postfiltered output |
| $\hat{s}(n)$ | reconstructed speech signal |
| r(n) | residual signal |
| x(n) | target signal |
| $x_2(n)$ | second target signal |
| v(n) | adaptive codebook contribution |
| c(n) | fixed codebook contribution |
| y(n) | v(n) * h(n) |
| z(n) | c(n) * h(n) |
| u(n) | excitation to LP synthesis filter |
| d(n) | correlation between target signal and h(n) |
| ew(n) | error signal |

TABLE 4

Glossary of variables.

| Name | Size | Description |
|---|---|---|
| $g_p$ | 1 | adaptive codebook gain |
| $g_c$ | 1 | fixed codebook gain |
| $g_o$ | 1 | modified gain for pitch postfilter |
| $g_{pit}$ | 1 | pitch gain for pitch postfilter |

TABLE 4-continued

Glossary of variables.

| Name | Size | Description |
|---|---|---|
| $g_f$ | 1 | gain term short-term postfilter |
| $g_t$ | 1 | gain term tilt postfilter |
| $T_{op}$ | 1 | open-loop pitch delay |
| $a_i$ | 10 | LP coefficients |
| $k_i$ | 10 | reflection coefficients |
| $o_i$ | 2 | LAR coefficients |
| $w_i$ | 10 | LSF normalized frequencies |
| $q_i$ | 10 | LSP coefficients |
| r(k) | 11 | correlation coefficients |
| $w_i$ | 10 | LSP weighting coefficients |
| $l_i$ | 10 | LSP quantizer output |

TABLE 5

Glossary of constants.

| Name | Value | Description |
|---|---|---|
| $f_s$ | 8000 | sampling frequency |
| $f_0$ | 60 | bandwidth expansion |
| $\gamma_1$ | 0.94/0.98 | weight factor perceptual weighting filter |
| $\gamma_2$ | 0.60/[0.4–0.7] | weight factor perceptual weighting filter |
| $\gamma_n$ | 0.55 | weight factor post filter |
| $\gamma_d$ | 0.70 | weight factor post filter |
| $\gamma_p$ | 0.50 | weight factor pitch post filter |
| $\gamma_t$ | 0.90/0.2 | weight factor tilt post filter |
| C | Table 7 | fixed (algebraic) codebook |
| L0 | Section 3.2.4 | moving average predictor codebook |
| L1 | Section 3.2.4 | First stage LSP codebook |
| L2 | Section 3.2.4 | Second stage LSP codebook (low part) |
| L3 | Section 3.2.4 | Second stage LSP codebook (high part) |
| GA | Section 3.9 | First stage gain codebook |
| GB | Section 3.9 | Second stage gain codebook |
| $w_{lag}$ | Eq. (6) | correlation lag window |
| $w_{lp}$ | Eq. (3) | LPC analysis window |

TABLE 6

Glossary of acronyms.

| Acronym | Description |
|---|---|
| CELP | code-excited linear-prediction |
| MA | moving average |
| MSB | most significant bit |
| LP | linear prediction |
| LSP | line spectral pair |
| LSF | line spectral frequency |
| VQ | vector quantization |

III.3 FUNCTIONAL DESCRIPTION OF THE ENCODER

In this section we describe the different functions of the encoder represented in the blocks of FIG. 3.

III.3.1 Pre-Processing

As stated in Subsection III.2, the input to the speech encoder is assumed to be a 16 bit PCM signal. Two pre-processing functions are applied before the encoding process: 1) signal scaling, and 2) high-pass filtering.

The scaling consists of dividing the input by a factor 2 to reduce the possibility of overflows in the fixed-point implementation. The high-pass filter serves as a precaution against undesired low-frequency components. A second order pole/zero filter with a cutoff frequency of 140 Hz is used. Both the scaling and high-pass filtering are combined by dividing the coefficients at the numerator of this filter by 2. The resulting filter is given by $$H_{h1}(z)=\frac{0.46363718-0.92724705z^{-1}+0.46363718z^{-2}}{1-1.9059465z^{-1}+0.9114024z^{-2}}. \quad (1)$$

The input signal filtered through $H_{h1}(z)$ is referred to as s(n), and will be used in all subsequent coder operations.

III.3.2 Linear Prediction Analysis and Quantization

The short-term analysis and synthesis filters are based on 10th order linear prediction (LP) filters. The LP synthesis filter is defined as $$\frac{1}{\hat{A}(z)}=\frac{1}{1+\sum_{i=1}^{10}\hat{a}_i z^{-i}}, \quad (2)$$

where $\hat{a}_i$, i=1, . . . , 10, are the (quantired) linear prediction (LP) coefficients. Short-term prediction, or linear prediction analysis is performed once per speech frame using the autocorrelation approach with a 30 ms asymmetric window. Every 80 samples (10 ms), the autocorrelation coefficients of windowed speech are computed and converted to the LP coefficients using the Levinson algorithm. Then the LP coefficients are transformed to the LSP domain for quantization and interpolation purposes. The interpolated quantized and unquantized filters are converted back to the LP filter coefficients (to construct the synthesis and weighting filters at each subframe).

III.3.2.1 Windowing and Autocorrelation Computation

The LP analysis window consists of two parts: the first part is half a Hamming window and the second part is a quarter of a cosine function cycle. The window is given by:

$$w_{lp}(n)=\begin{cases}0.54-0.46\cos\left(\frac{2\pi n}{399}\right), & n=0,\ldots,199,\\ \cos\left(\frac{2\pi(n-200)}{159}\right), & n=200,\ldots,239.\end{cases} \quad (3)$$

Figure 6:
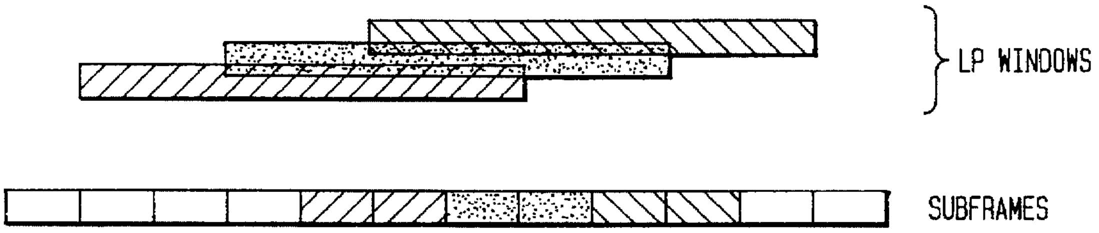
FIG. 6 presents an illustration of windowing in LP anaylsis.

There is a 5 ms lookahead in the LP analysis which means that 40 samples are needed from the future speech frame. This translates into an extra delay of 5 ms at the encoder stage. The LP analysis window applies to 120 samples from past speech frames, 80 samples from the present speech frame, and 40 samples from the future frame. The windowing in LP analysis is illustrated in FIG. 6.

The autocorrelation coefficients of the windowed speech $$s'(n)=w_{lp}(n)s(n),\ n=0,\ldots,239, \quad (4)$$

are computed by $$r(k)=\sum_{n=k}^{239}s'(n)s'(n-k),\quad k=0,\ldots,10, \quad (5)$$

To avoid arithmetic problems for low-level input signals the value of r(0) has a lower boundary of r(0)=1.0. A 60 Hz bandwidth expansion is applied, by multiplying the autocorrelaion coefficients with $$w_{lag}(k)=\exp\left[-\frac{1}{2}\left(\frac{2\pi f_0 k}{f_s}\right)^2\right],\quad k=1,\ldots,10, \quad (6)$$

where $f_0$=60 Hz is the bandwidth expansion and $f_s$=8000 Hz is the sampling frequency. Further, r(0) is multiplied by the white noise correction factor 1.0001, which is equivMent to adding a noise floor at −40 dB.

III.3.2.2 Levinson-Durbin Algorithm

The modified autocorrelation coefficients $$r'(0)=1.0001\, r(0)$$

$$r'(k)=w_{lag}(k)r(k),\ k=1,\ldots,10 \tag{7}$$

are used to obtain the LP filter coefficients $a_i$, i=1, . . . , 10, by solving the set of equations $$\sum_{i=1}^{10} a_i r'(|i-k|) = -r'(k), \quad k=1,\ldots,10. \tag{8}$$

The set of equations in (8) is solved using the Levinson-Durbin algorithm. This algorithm uses the following recursion:

$$
\begin{array}{l}
E(0) = r'(0) \\
\text{for } i = 1 \text{ to } 10 \\
\quad a_0^{(i-1)} = 1 \\
\quad k_i = -\left[\sum_{j=0}^{i-1} a_j^{(i-1)} r'(i-j)\right] / E(i-1) \\
\quad a_i^{(i)} = k_i \\
\quad \text{for } j = 1 \text{ to } i-1 \\
\qquad a_j^{(i)} = a_j^{(i-1)} + k_i a_{i-j}^{(i-1)} \\
\quad \text{end} \\
\quad E(i) = (1-k_i^2)E(i-1), \qquad \text{if } E(i) < 0 \text{ then } E(i) = 0.01 \\
\text{end}
\end{array}
$$

The final solution is given as $a_j=a_j^{(10)}$, j=1, . . . , 10.

III.3.2.3 LP to LSP Conversion

The LP filter coefficients $a_i$, i=1, . . . , 10 are converted to the line spectral pair (LSP) representation for quantization and interpolation purposes. For a 10th order LP filter, the LSP coefficients are defined as the roots of the sum and difference polynomials $$F'_1(z)=A(z)+z^{-11}A(z^{-1}), \tag{9}$$

and $$F'_2(z)=A(z)-z^{-11}A(z^{-1}), \tag{10}$$

respectively. The polynomial $F_1(z)$ is symmetric, and $F'_2(z)$ is antisymmetric. It can be proven that all roots of these polynomials are on the unit circle and they alternate each other. $F_1(z)$ has a root z=−1 (ω=π) and $F_2(z)$ has a root z=1 (ω=0). To eliminate these two roots, we define the new polynomials $$F_1(z)=F'_1(z)/(1+z^{-1}), \tag{11}$$

and $$F_2(z)=F'_2(z)/(1-z^{-1}). \tag{12}$$

Each polynomial has 5 conjugate roots on the unit circle ($e^{\pm j\omega_i}$), therefore, the polynomials can be written as $$F_1(z) = \prod_{i=1,3,\ldots,9} (1-2q_i z^{-1}+z^{-2}) \tag{13}$$

and

-continued $$F_2(z) = \prod_{i=2,4,\ldots,10} (1-2q_i z^{-1}+z^{-2}), \tag{14}$$

where $q_i=\cos(\omega_i)$ with $\omega_i$ being the line spectral frequencies (LSF) and they satisfy the ordering property $0<\omega_1<\omega_2<\ldots<\omega_{10}<\pi$. We refer to $q_i$ as the LSP coefficients in the cosine domain.

Since both polynomials $F_1(z)$ and $F_2(z)$ are symmetric only the first 5 coefficients of each polynomial need to be computed. The coefficients of these polynomials are found by the recursive relations $$f_1(i+1)=\alpha_{i+1}+\alpha_{10-i}-f_1(i),\ i=0,\ldots,4,$$

$$f_2(i+1)=\alpha_{i+1}-\alpha_{10-i}+f_2(i),\ i=0,\ldots,4, \tag{15}$$

where $f_1(0)=f_2(0)=1.0$. The LSP coefficients are found by evaluating the polynomials $F_1(z)$ and $F_2(z)$ at 60 points equally spaced between 0 and π and checking for sign changes. A sign change signifies the existence of a root and the sign change interval is then divided 4 times to better track the root. The Chebyshev polynomials are used to evaluate $F_1(z)$ and $F_2(z)$. In this method the roots are found directly in the cosine domain $\{q_i\}$. The polynomials $F_1(z)$ or $F_2(z)$, evaluated at $z=e^{jw}$, can be written as $$F(\omega)=2e^{-j5\omega}C(x), \tag{16}$$

with $$C(x)=T_5(x)+f(1)T_4(x)+f(2)T_3(x)+f(3)T_2(x)+f(4)T_1(x)+f(5)/2, \tag{17}$$

where $T_m(x)=\cos(m\omega)$ is the mth order Chebyshev polynomial, and f(i), i=1, . . . ,5, are the coefficients of either $F_1(z)$ or $F_2(z)$, computed using the equations in (15). The polynomial C(x) is evaluated at a certain value of x=cos(ω) using the recursire relation:

$$
\begin{array}{l}
\text{for } k = 4 \text{ downto } 1 \\
\quad b_k = 2xb_{k+1} - b_{k+2} + f(5-k) \\
\text{end} \\
C(x)\ xb_1 - b_2 + f(5)/2
\end{array}
$$

with initial values $b_5=1$ and $b_6=0$.

III.3.2.4 Quantization of the LSP Coefficients

The LP filter coefficients are quantized using the LSP representation in the frequency domain; that is $$\omega_i=\arccos(q_i),\ i=1,\ldots,10, \tag{18}$$

where $\omega_i$ are the line spectral frequencies (LSF) in the normalized frequency domain [0, π]. A switched 4th order MA prediction is used to predict the current set of LSF coefficients. The difference between the computed and predicted set of coefficients is quantized using a two-stage vector quantizer. The first stage is a 10-dimensional VQ using codebook L1 with 128 entries (7 bits). The second stage is a 10 bit VQ which has been implemented as a split VQ using two 5-dimensional codebooks, L2 and L3 containing 32 entries (5 bits) each.

To explain the quantization process, it is convenient to first describe the decoding process. Each coefficient is obtained from the sum of 2 codebooks:

$$l_i = \begin{cases} \mathcal{L}1_i(L1)+\mathcal{L}2_i(L2) & i=1,\ldots,5, \\ \mathcal{L}1_i(L1)+\mathcal{L}3_{(i-5)}(L3) & i=6,\ldots,10, \end{cases} \tag{19}$$

where L1, L2, and L3 are the codebook indices. To avoid sharp resonances in the quantized LP synthesis filters, the coefficients $l_i$ are arranged such that adjacent coefficients have a minimum distance of J. The rearrangement routine is shown below:

```
for i = 2, . . . , 10
   if (l_{i-1} > l_i - J)
      l_{i-1} = (l_i + l_{i-1} - J)/2
      l_i = (l_i + l_{i-1} + J)/2
   end
end
```

This rearrangement process is executed twice. First with a value of J=0.0001, then with a value of J=0.000095.

After this rearrangement process, the quantized LSF coefficients $\overline{\omega}_i^{(m)}$ for the current frame n, are obtained from the weighted sum of previous quantizer outputs $l^{(m-k)}$), and the current quantizer output $l^{(m)}$ $$\hat{\omega}_i^{(m)} = \left(1 - \sum_{k=1}^{4} m_i^k\right) l_i^{(m)} + \sum_{k=1}^{4} m_i^k l_i^{(m-k)}, \quad i = 1, \ldots, 10, \tag{20}$$

where $m_i^k$ are the coefficients of the switched MA predictor. Which MA predictor to use is defined by a separate bit L0. At startup the initial values of $l_i^{(k)}$ are given by $l_i = i\pi/11$ for all k<0.

After computing $\overline{\omega}_i$, the corresponding filter is checked for stability. This is done as follows:

1. Order the coefficient $\overline{\omega}_i$ in increasing value,
2. If $\overline{\omega}_1 < 0.005$ then $\overline{\omega}_i = 0.005$,
3. If $\overline{\omega}_{i+1} - \overline{\omega}_i < 0.0001$, then $\overline{\omega}_{i+1} = \overline{\omega}_i + 0.0001$ i=1, . . . ,9,
4. If $\overline{\omega}_{10} > 3.135$ then $\overline{\omega}_{10} = 3.135$.

The procedure for encoding the LSF parameters can be outlined as follows. For each of the two MA predictors the best approximation to the current LSF vector has to be found. The best approximation is defined as the one that minimizes a weighted mean-squared error $$E_{LPC} = \sum_{i=1}^{10} w_i(\omega_i - \hat{\omega}_i)^2. \tag{21}$$

The weights $\omega_i$ are made adaptive as a function of the unquantized LSF coefficients, $$w_1 = \begin{cases} 1.0 & \text{if } \omega_2 - 0.04\pi - 1 > 0, \\ 10(\omega_2 - 0.04\pi - 1)^2 + 1 & \text{otherwise} \end{cases} \tag{22}$$

$$w_i\ 2 \leq i \leq 9 = \begin{cases} 1.0 & \text{if } \omega_{i+1} - \omega_{i-1} - 1 > 0, \\ 10(\omega_{i+1} - \omega_{i-1} - 1)^2 + 1 & \text{otherwise} \end{cases}$$

$$w_{10} = \begin{cases} 1.0 & \text{if } -\omega_9 + 0.92\pi - 1 > 0, \\ 10(-\omega_9 + 0.92\pi - 1)^2 + 1 & \text{otherwise} \end{cases}$$

In addition, the weights $\omega_5$ and $\omega_6$ are multiplied by 1.2 each.

The vector to be quantized for the current frame is obtained from $$l_i = \left[\hat{\omega}_i^{(m)} - \sum_{k=1}^{4} m_i^k l_i^{(m-k)}\right] / \left(1 - \sum_{k=1}^{4} m_i^k\right), \quad i = 1, \ldots, 10. \tag{23}$$

The first codebook L1 is searched and the entry L1 that minimizes the (unweighted) meansquared error is selected. This is followed by a search of the second codebook L2, which defines the lower part of the second stage. For each possible candidate, the partial vector $\overline{\omega}_i$=1, . . . ,5 is reconstructed using Eq. (20), and rearranged to guarantee a minimum distance of 0.0001. The vector with index L2 which after addition to the first stage candidate and rearranging, approximates the lower part of the corresponding target best in the weighted MSE sense is selected. Using the selected first stage vector L1 and the lower part of the second stage (L2), the higher part of the second stage is searched from codebook L3. Again the rearrangement procedure is used to guarantee a minimum distance of 0.0001. The vector L3 that minimizes the overall weighted MSE is selected.

This process is done for each of the two MA predictors defined by L0, and the MA predictor L0 that produces the lowest weighted MSE is selected.

III.3.2.5 Interpolation of the LSP Coefficients

The quantized (and unquantized) LP coefficients are used for the second subframe. For the first subframe, the quantized (and unquantized) LP coefficients are obtained from linear interpolation of the corresponding parameters in the adjacent subframes. The interpolation is done on the LSP coefficients in the q domain. Let $q_i^{(m)}$ be the LSP coefficients at the 2nd subframe of frame m, and $q_i^{(m-1)}$ the LSP coefficients at the 2nd subframe of the past frame (m−1). The (unquantized) interpolated LSP coefficients in each of the 2 subframes are given by $$\begin{aligned} &\text{Subframe 1:} \quad q1_i = 0.5q_i^{(m-1)} + 0.5q_i^{(m)}, \quad i = 1, \ldots, 10, \\ &\text{Subframe 2:} \quad q2_i = q_i^{m} \qquad\qquad\qquad i = 1, \ldots, 10. \end{aligned} \tag{24}$$

The same interpolation procedure is used for the interpolation of the quantized LSP coeffidents by substituting $q_i$ by $\overline{q}_i$ in Eq. (24).

III.3.2.6 LSP to LP Conversion

Once the LSP coefficients are quantized and interpolated, they are converted back to LP coefficients $\{a_i\}$. The conversion to the LP domain is done as follows. The coefficients of $F_1(z)$ and $F_2(z)$ are found by expanding Eqs. (13) and (14) knowing the quantized and interpolated LSP coefficients. The following recursive relation is used to compute $f_1(i)$, i=1, . . . ,5, from $q_i$

```
for i = 1 to 5
   f_1(i) = -2q_{2i-1}f_1(i - 1) + 2f_1(i - 2)
   for j = i - 1 downto 1
      f_1(j) = f_1(j) - 2q_{2i-1}f_1(j - 1) + f_1(j - 2)
   end
end
```

with initial values $f_1(0)=1$ and $f_1(-1)=0$. The coefficients $f_2(i)$ are computed similarly by replacing $q_{2i-1}$ by $q_{2i}$.

Once the coefficients $f_1(i)$ and $f_2(i)$ are found, $F_1(z)$ and $F_2(z)$ are multiplied by $1+z^{-1}$ and $1-z^{-1}$ respectively, to obtain $F'_1(z)$ and $F'_2(z)$; that is $$\begin{aligned} f_1'(i) &= f_1(i) + f_1(i-1), \quad i = 1, \ldots, 5, \\ f_2'(i) &= f_2(i) - f_2(i-1), \quad i = 1, \ldots, 5. \end{aligned} \tag{25}$$

Finally the LP coefficients are found by $$a_i = \begin{cases} 0.5f_1'(i) + 0.5f_2'(i), & i = 1, \ldots, 5, \\ 0.5f_1'(i-5) - 0.5f_2'(i-5), & i = 1, \ldots, 10. \end{cases} \tag{26}$$

This is directly derived from the relation $A(z)=(F_1(z)+F_2(z))/2$, and because $F_1(z)$ and $F_2(z)$ are symmetric and antisymmetric polynomials, respectively.

III.3.3 Perceptual Weighting

The perceptual weighting filter is based on the unquantized LP filter coefficients and is given by $$W(z)=\frac{A(z/\gamma_1)}{A(z/\gamma_2)}=\frac{1+\sum_{i=1}^{10}\gamma_1^i a_i z^{-i}}{1+\sum_{i=1}^{10}\gamma_2^i a_i z^{-i}}. \quad (27)$$

The values of $\gamma_1$ and $\gamma_2$ determine the frequency response of the filter W(z). By proper adjustment of these variables it is possible to make the weightihg more effective. This is accomplished by making $\gamma_1$ and $\gamma_2$ a function of the spectral shape of the input signal. This adaptation is done once per 10 ms frame, but an interpolation procedure for each first subframe is used to smooth this adaptation process. The spectral shape is obtained from a 2nd-order linear prediction filter, obtained as a by product from the Levinson-Durbin recursion (Subsection III.3.2.2). The reflection coefficients $k_i$, are converted to Log Area Ratio (LAB,) coefficients $o_i$ by $$o_i=\log\frac{(1.0+k_i)}{(1.0-k_i)} \qquad i=1,2. \quad (28)$$

These LAB, coefficients are used for the second subframe. The LAB, coefficients for the first subframe are obtained through linear interpolation with the LAB, parameters from the previous frame, and are given by:

$$\text{Subframe 1: } o1_i=0.5o_i^{(m-1)}+0.5o_i^{(m)}, \quad i=1,\ldots,2, \quad (29)$$

$$\text{Subframe 2: } o2_i=o_i^{(m)}, \quad i=1,\ldots,2.$$

The spectral envelope is characterized as being either fiat (flat=1) or tilted (flat=0). For each subframe this characterization is obtained by applying a threshold function to the LAR coefficients. To avoid rapid changes, a hysteresis is used by taking into account the value of flat in the previous subframe (m−1), $$flat^{(m)}=\begin{cases}0 & \text{if } o_1<-1.74 \text{ and } o_2>0.65 \text{ and } flat^{(m-1)}=1,\\ 1 & \text{if } o_1>-1.52 \text{ and } o_2<0.43 \text{ and } flat^{(m-1)}=0,\\ flat^{(m-1)} & \text{otherwise.}\end{cases} \quad (30)$$

If the interpolated spectrum for a subframe is classified as flat ($flat^{(m)}=1$), the weight factors are set to $\gamma_1=0.94$ and $\gamma_2=0.6$. If the spectrum is classified as tilted ($flat^{(m)}=0$), the value of $\gamma_1$ is set to 0.98, and the value of $\gamma_2$ is adapted to the strength of the resonances in the LP synthesis filter, but is bounded between 0.4 and 0.7. If a strong resonance is present, the value of $\gamma_2$ is set closer to the upperbound. This adaptation is achieved by a criterion based on the minimum distance between 2 successive LSP coefficients for the current subframe. The minimum distance is given by $$d_{min}=min[\omega_{i+1}-\omega_i]i=1,\ldots,9. \quad (31)$$

The following linear relation is used to compute $\gamma_2$:

$$\gamma_2=6.0*d_{min}+1.0, \textit{ and } 0.4\leqq\gamma_2\leqq 0.7 \quad (32)$$

The weighted speech signal in a subframe is given by $$sw(n)=s(n)+\sum_{i=1}^{10}a_i\gamma_1^i s(n-i)-\sum_{i=1}^{10}a_i\gamma_2^i sw(n-i), \quad (33)$$

$$n=0,\ldots,39.$$

The weighted speech signal sw(n) is used to find an estimation of the pitch delay in the speech frame.

III.3.4 Open-Loop Pitch Analysis

To reduce the complexity of the search for the best adaptive codebook delay, the search range is limited around a candidate delay $T_{op}$, obtained from an open-loop pitch analysis. This open-loop pitch analysis is done once per frame (10 ms). The open-loop pitch estimation uses the weighted speech signal sw(n) of Eq. (33), and is done as follows: In the first step, 3 maxima of the correlation $$R(k)=\sum_{n=0}^{79}sw(n)sw(n-k) \quad (34)$$

are found in the following three ranges $$i=1: 80,\ldots,143,$$
$$i=2: 40,\ldots,79,$$
$$i=3: 20,\ldots,39.$$

The retained maxima $R(t_i)$, i=1, . . . , 3, are normalized through $$R'(t_i)=\frac{R(t_i)}{\sqrt{\sum_n sw^2(n-t_i)}}, \quad i=1,\ldots,3, \quad (35)$$

The winner among the three normalized correlations is selected by favoring the delays with the values in the lower range. This is done by weighting the normalized correlations corresponding to the longer delays. The best open-loop delay $T_{op}$ is determined as follows:

$$\begin{aligned}&T_{op}=t_1\\&R'(T_{op})=R'(t_1)\\&\text{if } R'(t_2)\geqq 0.85R'(T_{op})\\&\quad R'(T_{op})=R'(t_2)\\&\quad T_{op}=t_2\\&\text{end}\\&\text{if } R'(t_3)\geqq 0.85R(T_{op})\\&\quad R'(T_{op})=R'(t_3)\\&\quad T_{op}=t_3\\&\text{end}\end{aligned}$$

This procedure of dividing the delay range into 3 sections and favoring the lower sections is used to avoid choosing pitch multiples.

III.3.5 Computation of the Impulse Response

The impulse response, h(n), of the weighted synthesis filter W(z)/Â(z) is computed for each subframe. This impulse response is needed for the search of adaptive and fixed codebooks. The impuise response h(n) is computed by filtering the vector of coefficients of the filter $A(z/\gamma_1)$ extended by zeros through the two filters 1/Â(z) and $1/A(z/\gamma_2)$.

III.3.6Computation of the Target Signal

The target signal x(n) for the adaptive codebook search is usually computed by subtracting the zero-input response of the weighted synthesis filter $W(z)/\hat{A}(z)=A(z/\gamma_1)/[\hat{A}(z)A(z/\gamma_2)]$ from the weighted speech signal sw(n) of Eq. (33). This is done on a subframe basis.

An equivalent procedure for computing the target signal, which is used in this Recommendation, is the filtering of the LP residual signal r(n) through the combination of synthesis filter 1/Â(z) and the weighting filter $A(z/\gamma_1)/A(z/\gamma_2)$. After determining the excitation for the subframe, the initial states of these filters are updated by filtering the difference between the LP residual and excitation. The memory update of these filters is explained in Subsection III.3.10.

The residual signal r(n), which is needed for finding the target vector is also used in the adaptive codebook search to extend the past excitation buffer. This simplifies the adaptive codebook search procedure for delays less than the subframe size of 40 as will be explained in the next section. The LP residual is given by $$r(n)=s(n)+\sum_{i=1}^{10}\hat{a}_i s(n-i),\qquad n=0,\ldots,39. \tag{36}$$

III.3.7 Adaptive-Codebook Search

The adaptive-codebook parameters (or pitch parameters) are the delay and gain. In the adaptive codebook approach for implementing the pitch filter, the excitation is repeated for delays less than the subframe length. In the search stage, the excitation is extended by the LP residual to simplify the closed-loop search. The adaptive-codebook search is done every (5 ms) subframe. In the first subframe, a fractional pitch delay $T_1$ is used with a resolution of ⅓ in the range [19⅓, 84⅔] and integers only in the range [85, 143]. For the second subframe, a delay $T_2$ with a resolution of ⅓ is always used in the range [(int)$T_1$−5⅔, (int)$T_1$+4⅔], where (int)$T_1$ is the nearest integer to the fractional pitch delay $T_1$ of the first subframe. This range is adapted for the cases where $T_1$ straddles the boundaries of the delay range.

For each subframe the optimal delay is determined using close&loop analysis that minimizes the weighted mean-squared error. In the first subframe the delay $T_1$ is found be searching a small range (6 samples) of delay values around the open-loop delay $T_{op}$ (see Subsection III.3.7). The search boundaries $t_{min}$ and $t_{max}$ are defined by $t_{min}=T_{op}-3$ if $t_{min}$ < 20 then $t_{min}$ = 20
$t_{max}=t_{min}+6$
if $t_{max}$ > 143 then
    $t_{max}$ = 143
    $t_{min}=t_{max}-6$
end For the second subframe, closed-loop pitch analysis is done around the pitch selected in the first subframe to find the optimal delay $T_2$. The search boundaries are between $t_{min}$−⅔ and $t_{max}$+⅔, where $t_{min}$ and $t_{max}$ are derived from $T_1$ as follows:

$t_{min}$ = (int)$T_1$ − 5
if $t_{min}$ < 20 then $t_{min}$ = 20
$t_{max}=t_{min}+9$
if $t_{max}$ > 143 then
    $t_{max}$ = 143
    $t_{min}=t_{max}-9$
end The closed-loop pitch search minimizes the mean-squared weighted error between the original and synthesized speech. This is achieved by maximizing the term $$R(k)=\frac{\sum_{n=0}^{39}x(n)y_k(n)}{\sqrt{\sum_{n=0}^{39}y_k(n)y_k(n)}}, \tag{37}$$

where x(n) is the target signal and $y_k(n)$ is the past filtered excitation ae delay k (past excitation convolved with h(n)). Note that the search range is limited around a preselected value, which is the open-loop pitch $T_{op}$ for the first subframe, and $T_1$ for the second subframe.

The convolution $y_k(n)$ is computed for the delay $t_{min}$, and for the other integer delays in the search range k=$t_{min}$+1, . . . , $t_{max}$, it is updated using the recursive relation $$y_k(n)=y_{k-1}(n-1)+u(-k)h(n),\ n=39,\ldots,0, \tag{38}$$

where u(n), n=−143, . . . ,39, is the excitation buffer, and $y_{k-1}(-1)=0$. Note that in the search stage, the samples u(n), n=0, . . . ,39 are not known, and they are needed for pitch delays less than 40. To simplify the search, the LP residual is copied to u(n) to make the relation in Eq. (38) valid for all delays.

For the determination of $T_2$, and $T_1$ if the optimum integer closed-loop delay is less than 84, the fractions around the optimum integer delay have to be tested. The fractional pitch search is done by interpolating the normalized correlation in Eq. (37) and searching for its maximum. The interpolation is done using a FIR filter $b_{12}$ based on a Hamming windowed sine function with the sine truncated at ±11 and padded with zeros at ±12 ($b_{12}(12)=0$). The filter has its cut-off frequency (−3 dB) at 3600 Hz in the oversampled domain. The interpolated values of R(k) for the fractions −⅔, −⅓, 0, ⅓, and ⅔ are obtained using the interpolation formula $$R(k)_t=\sum_{i=0}^{3}R(k-i)b_{12}(t+i.3)+\sum_{i=0}^{3}R(k+1+i)b_{12}(3-t+i.3),\quad t=0,1,2, \tag{39}$$

where t=0, 1, 2 corresponds to the fractions 0, ⅓, and ⅔, respectively. Note that it is necessary to compute correlation terms in Eq. (37) using a range $t_{min}$−4,$t_{max}$+4, to allow for the proper interpolation.

III.3.7.1 Generation of the Adaptive Codebook Vector

Once the noninteger pitch delay has been determined, the adaptive codebook vector v(n) is computed by interpolating the past excitation signal u(n) at the given integer delay k and fraction t $$v(n)=\sum_{i=0}^{9}u(n-k+i)b_{30}(t+i.3)+\sum_{i=0}^{9}u(n-k+1+i)b_{30}(3-t+i.3),\quad n=0,1,2. \tag{40}$$

The interpolation filter $b_{30}$ is based on a Hamming windowed sine functions with the sine truncated at ±29 and padded with zeros at ±30 ($b_{30}(30)=0$). The filters has a cut-off frequency (−3 dB) at 3600 Hz in the oversampled domain.

III.3.7.2 Codeword Computation for Adaptive Codebook Delays

The pitch delay $T_1$ is encoded with 8 bits in the first subframe and the relative delay in the second subframe is encoded with 5 bits. A fractional delay T is represented by its integer part (int)T, and a fractional part frac/3, frac=−1, 0, 1. The pitch index P1 is now encoded as $$P1=\begin{cases}((int)T_1-19)*3+frac-1, & \text{if } T_1=[19,\ldots,85], frac=[-1,0,1]\\ ((int)T_1-85)+197, & \text{if } T_1=[86,\ldots,143], frac=0\end{cases} \tag{41}$$

The value of the pitch delay $T_2$ is encoded relative to the value of $T_1$. Using the same interpretation as before, the fractional delay $T_2$ represented by its integer part (int)$T_2$, and a fractional part frac/3, frac=−1, 0, 1, is encoded as $$P2=((int)T_2-t_{min})*3+frac+2 \tag{42}$$

where $t_{min}$ is derived from $T_1$ as before.

To make the coder more robust against random bit errors, a parity bit P0 is computed on the delay index of the first subframe. The parity bit is generated through an XOR operation on the 6 most significant bits of P1. At the decoder this parity bit is recomputed and if the recomputed value does not agree with the transmitted value, an error concealment procedure is applied.

III.3.7.3 Computation of the Adaptive-Codebook Gain

Once the adaptive-codebook delay is determined, the adaptive-codebook gain $g_p$ is computed as $$g_p = \frac{\sum_{n=0}^{39} x(n)y(n)}{\sum_{n=0}^{39} y(n)y(n)}, \quad \text{bounded by } 0 \leq g_p \leq 1.2, \tag{43}$$

where y(n) is the filtered adaptive codebook vector (zero-state response of $W(z)/\hat{A}(z)$ to v(n)). This vector is obtained by convolving v(n) with h(n)

$$y(n) = \sum_{i=0}^{n} v(i)h(n-i) \quad n = 0, \ldots, 39. \tag{44}$$

Note that by maximizing the term in Eq. (37) in most cases $g_p>0$: In case the signal contains only negative correlations, the value of $g_p$ is set to 0.

III.3.8 Fixed Codebook: Structure and Search

The fixed codebook is based on an algebraic codebook structure using an interleaved single-pulse permutation (ISPP) design. In this codebook, each codebook vector contains 4 non-zero pulses. Each pulse can have either the amplitudes +1 or −1, and can assume the positions given in Table 7.

The codebook vector c(n) is constructed by taking a zero vector, and putting the 4 unit pulses at the found locations, multiplied with their corresponding sign.

$$c(n)=s0\delta(n-i0)+s1\delta(n-i1)+s2\delta(n-i2)+s3\delta(n-i3),\ n=0, \ldots, 39. \tag{45}$$

where δ(0) is a unit pulse. A special feature incorporated in the codebook is that the selected codebook vector is filtered through an adaptive pre-filter P(z) which enhances harmonic components to improve the synthesized speech quality. Here the filter $$P(z)=1/(1-\beta z^{-T}) \tag{46}$$

TABLE 7

Structure of fixed codebook C.

| Pulse | Sign | Positions |
|---|---|---|
| 10 | s0 | 0, 5, 10, 15, 20, 25, 30, 35 |
| 11 | s1 | 1, 6, 11, 16, 21, 26, 31, 36 |
| 12 | s2 | 2, 7, 12, 17, 22, 27, 32, 37 |
| 13 | s3 | 3, 8, 13, 18, 23, 28, 33, 38 |
| | | 4, 9, 14, 19, 24, 29, 34, 39 |

is used, where T is the integer component of the pitch delay of the current subframe, and β is a pitch gain. The value of β is made adaptive by using the quantized adaptive codebook gain from the previous subframe bounded by 0.2 and 0.8.

$$\beta=\hat{g}_p^{(m-1)},\ 0.2\leq\beta\leq 0.8. \tag{47}$$

This filter enhances the harmonic structure for delays less than the subframe size of 40. This modification is incorporated in the fixed codebook search by modifying the impulse response h(n), according to $$h(n)=h(n)+\beta h(n-T),\ n=T, \ldots, 39. \tag{48}$$

III.3.8.1 Fixed-Codebook Search Procedure

The fixed codebook is searched by minimizing the mean-squared error between the weighted input speech sw(n) of Eq. (33), and the weighted reconstructed speech. The target signal used in the closed-loop pitch search is updated by subtracting the adaptive codebook contribution. That is $$x_2(n)=x(n)-g_p y(n),\ n=0, \ldots, 39, \tag{49}$$

where y(n) is the filtered adaptive codebook vector of Eq. (44).

The matrix H is defined as the lower triangular Toepliz convolution matrix with diagonal h(0) and lower diagonals h(1), . . . , h(39). If $c_k$ is the algebraic codevector at index k, then the codebook is searched by maximizing the term $$\frac{C_k^2}{E_k} = \frac{\left(\sum_{n=0}^{39} d(n)c_k(n)\right)^2}{c_k{}^t\Phi c_k}, \tag{50}$$

where d(n) is the correlation between the target signal $x_2(n)$ and the impulse response h(n), and $\Phi=H^tH$ is the matrix of correlations of h(n). The signal d(n) and the matrix Φ are computed before the codebook search. The elements of d(n) are computed from $$d(n) = \sum_{i=n}^{39} x(i)h(i-n), \quad n = 0, \ldots, 39, \tag{51}$$

and the elements of the symmetric matrix Φ are computed by $$\phi(i,j) = \sum_{n=j}^{39} h(n-i)h(n-j), \quad (j \geq i). \tag{52}$$

Note that only the elements actually needed are computed and an efficient storage procedure has been designed to speed up the search procedure.

The algebraic structure of the codebook C allows for a fast search procedure since the codebook vector $c_k$ contains only four nonzero pulses. The correlation in the numerator of Eq. (50) for a given vector $c_k$ is given by $$C = \sum_{i=0}^{3} a_i d(m_i), \tag{53}$$

where $m_i$ is the position of the ith pulse and $a_i$ is its amplitude. The energy in the denominator of Eq. (50) is given by $$E = \sum_{i=0}^{3} \phi(m_i, m_i) + 2\sum_{i=0}^{2}\sum_{j=i+1}^{3} a_i a_j \phi(m_i, m_j). \tag{54}$$

To simplify the search procedure, the pulse amplitudes are predetermined by quantizing the signal d(n). This is done by setting the amplitude of a pulse at a certain position equal to the sign of d(n) at that position. Before the codebook search, the following steps are done. First, the signal d(n) is decomposed into two signals: the absolute signal $d'(n)=|d(n)|$ and the sign signal sign[d(n)]. Second, the matrix Φ is modified by including the sign information; that is, $$\phi'(i,j)=\text{sign}[d(i)]\text{sign}[d(j)]\phi(i,j),\ i=0, \ldots, 39,\ j=i, \ldots, 39. \tag{55}$$

To remove the factor 2 in Eq. (54)

$$\phi'(i,i)=0.5\phi(i,i),\ i=0,\ldots,39. \quad (56)$$

The correlation in Eq. (53) is now given by $$C=d'(m_0)+d'(m_1)+d'(m_2)+d'(m_3), \quad (57)$$

and the energy in Eq. (54) is given by $$E=\phi'(m_0,m_0)$$
$$+\phi'(m_1,m_1)+\phi'(m_0,m_1)$$
$$+\phi'(m_2,m_2)+\phi'(m_0,m_2)+\phi'(m_1m_2)$$
$$+\phi'(m_3,m_3)+\phi'(m_1,m_3)+\phi'(m_2,m_3). \quad (58)$$

A focused search approach is used to further simplify the search procedure. In this approach a procomputed threshold is tested before entering the last loop, and the loop is entered only if this threshold is exceeded. The maximum number of times the loop can be entered is fixed so that a low percentage of the codebook is searched. The threshold is computed based on the correlation C. The maximum absolute correlation and the average correlation due to the contribution of the first three pulses, $max_3$ and $av_3$, are found before the codebook search. The threshold is given by $$thr_3=av_3+K_3(max_3-av_3). \quad (59)$$

The fourth loop is entered only if the absolute correlation (due to three pulses) exceeds $thr_3$, where $0\leqq K_3<1$. The value of $K_3$ controls the percentage of codebook search and it is set here to 0.4. Note that this results in a variable search time, and to further control the search the number of times the last loop is entered (for the 2 subframes) cannot exceed a certain maximum, which is set here to 180 (the average worst case per subframe is 90 times).

III.3.8.2 Codeword Computation of the Fixed Codebook

The pulse positions of the pulses i0, i1, and i2, are encoded with 3 bits each, while the position of i3 is encoded with 4 bits. Each pulse amplitude is encoded with 1 bit. This gives a total of 17 bits for the 4 pulses. By defining s=1 if the sign is positive and s=0 is the sign is negative, the sign codeword is obtained from $$S=s0+2*s1+4*s2+8*s3 \quad (60)$$

and the fixed codebook codeword is obtained from $$C=(i0/5)+8*(i1/5)+64*(i2/5)+512*(2*(i3/5)+jx) \quad (61)$$

where jx=0 if i3=3,8, . . . , and jz=1 if i3=4,9, . . .

III.3.9 Quantization of the Gains

The adaptive-codebook gain (pitch gain) and the fixed (algebraic) codebook gain are vector quantized using 7 bits. The gain codebook search is done by minimizing the mean-squared weighted error between original and reconstructed speech which is given by $$E=x^tx+g_p^2Y^ty+g_c^2z^tz-2g_px^ty-2g_cx^tz+2g_pg_cy^tz, +tm \quad (62)$$

where x is the target vector (see Subsection III.3.6), y is the filtered adaptive codebook vector of Eq. (44), and z is the fixed codebook vector convolved with h(n), $$z(n)=\sum_{i=0}^{n} c(i)h(n-i) \quad n=0,\ldots,39. \quad (63)$$

III.3.9.1 Gain Prediction

The fixed codebook gain gc can be expressed as $$g_c=\gamma g'_c, \quad (64)$$

where $g'_c$ is a predicted gain based on previous fixed codebook energies, and $\gamma$ is a correction factor.

The mean energy of the fixed codebook contribution is given by $$E=10\log\left(\frac{1}{40}\sum_{i=0}^{39}c_i^2\right). \quad (65)$$

After scaling the vector $c_i$ with the fixed codebook gain $g_c$, the energy of the scaled fixed codebook is given by 20 log $g_c$+E. Let $E^{(m)}$ be the mean-removed energy (in dB) of the (scaled) fixed codebook contribution at subframe m, given by $$E^{(m)}=20\log g_c+E-\bar{E}, \quad (66)$$

where $\bar{E}$=30 dB is the mean energy of the fixed codebook excitation. The gain $g_c$ can be expressed as a function of $E^{(m)}$, E, and $\bar{E}$ by $$g_c=10^{(E^{(m)}+\bar{E}-E)/20} \quad (67)$$

The predicted gain $g'_c$ is found by predicting the log-energy of the current fixed codebook contribution from the log-energy of previous fixed codebook contributions. The 4th order MA prediction is done as follows. The predicted energy is given by $$\tilde{E}^{(m)}=\sum_{i=1}^{4} b_i\hat{R}^{(m-i)}, \quad (68)$$

where $[b_1\ b_2\ b_3\ b_4]$=[0.68 0.58 .034 0.19] are the MA prediction coefficients, and $\hat{R}^{(m)}$ is the quantized version of the prediction error $R^{(m)}$ at subframe m, defined by $$R^{(m)}=E^{(m)}-\tilde{E}^{(m)}. \quad (69)$$

The predicted gain $g'_c$ is found by replacing $E^{(m)}$ by its predicted value in Eq (67).

$$g'_c=10^{\tilde{E}^{(m)}+\bar{E}-E/20}. \quad (70)$$

The correction factor $\gamma$ is related to the gain-prediction error by $$R^{(m)}=E^{(m)}-\tilde{E}^{(m)}=20\log(\gamma). \quad (71)$$

III.3.9.2 Codebook Search for Gain Quantization

The adaptive-codebook gain, $g_p$, and the factor $\gamma$ are vector quantized using a 2-stage conjugate structured codebook. The first stage consists of a 3 bit two-dimensional codebook GA, and the second stage consists of a 4 bit two-dimensional codebook GB. The first element in each codebook represents the quantized adaptive codebook gain $\hat{g}_p$, and the second element represents the quantized fixed codebook gain correction factor $\hat{\gamma}$. Given codebook indices m and n for GA and GB, respectively, the quantized adaptive-codebook gain is given by $$\hat{g}_p=GA_1(m)+GB_1(n), \quad (72)$$

and the quantized fixed-codebook gain by $$\hat{g}_c = g'_c\hat{\gamma} = g'_c(GA_2(m) + GB_2(n)). \quad (73)$$

This conjugate structure simplifies the codebook search, by applying a pre-selection process. The optimum pitch gain $g_p$, and fixed-codebook gain, $g_c$, are derived from Eq. (62), and are used for the pre-selection. The codebook GA contains 8 entries in which the second element (corresponding to $g_c$) has in general larger values than the first element (corresponding to $g_p$). This bias allows a pre-selection using the value of $g_c$. In this pre-selection process, a cluster of 4 vectors whose second element are close to $gx_c$, where $gx_c$ is derived from $g_c$ and $g_p$. Similarly, the codebook GB contains 16 entries in which have a bias towards the first element (corresponding to $g_p$). A cluster of 8 vectors whose first elements are close to $g_p$ are selected. Hence for each codebook the best 50% candidate vectors are selected. This is followed by an exhaustive search over the remaining 4*8=32 possibilities, such that the combination of the two indices minimizes the weighted mean-squared error of Eq. (62).

III.3.9.3 Codeword Computation for Gain Quantizer

The codewords GA and GB for the gain quantizer are obtained from the indices corresponding to the best choice. To reduce the impact of single bit errors the codebook indices are mapped.

III.3.10 Memory Update

An update of the states of the synthesis and weighting filters is needed to compute the target signal in the next subframe. After the two gains are quantized, the excitation signal, u(n), in the present subframe is found by $$u(n) = \hat{g}_p v(n) + \hat{g}_c c(n),\ n=0, \ldots, 39, \quad (74)$$

where $\hat{g}_p$ and $\hat{g}_c$ are the quantized adaptive and fixed codebook gains, respectively, v(n) the adaptive codebook vector (interpolated past excitation), and c(n) is the fixed codebook vector (algebraic codevector including pitch sharpening). The states of the filters can be updated by filtering the signal r(n)−u(n) (difference between residual and excitation) through the filters $1/\hat{A}(z)$ and $A(z/\gamma_1)/A(z/\gamma_2)$ for the 40 sample subframe and saving the states of the filters. This would require 3 filter operations. A simpler approach, which requires only one filtering is as follows. The local synthesis speech, $\hat{s}(n)$, is computed by filtering the excitation signal through $1/\hat{A}(z)$. The output of the filter due to the input r(n)−u(n) is equivalent to $e(n)=s(n)-\hat{s}(n)$. So the states of the synthesis filter $1/\hat{A}(z)$ are given by e(n), n=30, . . . ,39. Updating the states of the filter $A(z/\gamma_1)/A(z/\gamma_2)$ can be done by filtering the error signal e(n) through this filter to find the perceptually weighted error ew(n). However, the signal ew(n) can be equivalently found by $$ew(n) = x(n) - \hat{g}_p y(n) + \hat{g}_c z(n) \quad (75)$$

Since the signals z(n), y(n), and z(n) are available, the states of the weighting filter are updated by computing ew(n) as in Eq. (75) for n=30, . . . ,39. This saves two filter operations.

III.3.11 Encoder and Decoder Initialization

All static encoder variables should be initialized to 0, except the variables listed in table 8. These variables need to be initialized for the decoder as well.

TABLE 8

Description of parameters with nonzero initialization.

| Variable | Reference | Initial value |
|---|---|---|
| $\beta$ | Section 3.8 | 0.8 |
| $l_i$ | Section 3.2.4 | $i\pi/11$ |
| $q_i$ | Section 3.2.4 | 0.9595, . . . , |
| $\hat{R}^{(k)}$ | Section 3.9.1 | −14 |

III.4.0 FUNCTIONAL DESCRIPTION OF THE DECODER

The signal flow at the decoder was shown in Subsection III.2 (FIG. 4). First the parameters are decoded (LP coefficients, adaptive codebook vector, fixed codebook vector, and gains). These decoded parameters are used to compute the reconstructed speech signal. This process is described in Subsection III.4.1. This reconstructed signal is enhanced by a post-processing operation consisting of a postfilter and a high-pass filter (Subsection III.4.2). Subsection III.4.3 describes the error concealment procedure used when either a parity error has occurred, or when the frame erasure flag has been set.

III.4.1 Parameter Decoding Procedure

The transmitted parameters are listed in Table 9. At startup all static encoder variables should be initialized to 0, except the variables listed in Table 8. The decoding process is done in the following order:

TABLE 9

Description of transmitted parameters indices. The bitstream ordering is reflected by the order in the table. For each parameter the most significant bit (MSB) is transmitted first.

| Symbol | Description | Bits |
|---|---|---|
| L0 | Switched predictor index of LSP quantizer | 1 |
| L1 | First stage vector of LSP quantizer | 7 |
| L2 | Second stage lower vector of LSP quantizer | 5 |
| L3 | Second stage higher vector of LSP quantizer | 5 |
| P1 | Pitch delay 1st subframe | 8 |
| P0 | Parity bit for pitch | 1 |
| S1 | Signs of pulses 1st subframe | 4 |
| C1 | Fixed codebook 1st subframe | 13 |
| GA1 | Gain codebook (stage 1) 1st subframe | 3 |
| GB1 | Gain codebook (stage 2) 1st subframe | 4 |
| P2 | Pitch delay 2nd subframe | 5 |
| S2 | Signs of pulses 2nd subframe | 4 |
| C2 | Fixed codebook 2nd subframe | 13 |
| GA2 | Gain codebook (stage 1) 2nd subframe | 3 |
| GB2 | Gain codebook (stage 2) 2nd subframe | 4 |

III.4.1.1 Decoding of LP Filter Parameters

The received indices L0, L1, L2, and L3 of the LSP quantizer are used to reconstruct the quantized LSP coefficients using the procedure described in Subsection III.3.2.4. The interpolation procedure described in Subsection III.3.2.5 is used to obtain 2 interpolated LSP vectors (corresponding to 2 subframes). For each subframe, the interpolated LSP vector is converted to LP filter coefficients $a_i$, which are used for synthesizing the reconstructed speech in the subframe.

The following steps are repeated for each subframe:

1. decoding of the adaptive codebook vector,
2. decoding of the fixed codebook vector, 3. decoding of the adaptive and fixed codebook gains,
4. computation of the reconstructed speech,

III.4.1.2 Decoding of the Adaptive Codebook Vector

The received adaptive codebook index is used to find the integer and fractional parts of the pitch delay. The integer part (int)$T_1$ and fractional part frac of $T_1$ are obtained from P1 as follows:

```
if P1 < 197
    (int)T1 = (P1 + 2)/3 + 19
    frac = P1 − (int)T1*3 + 58
else
    (int)T1 = P1 − 112
    frac = 0
end
```

The integer and fractional part of $T_2$ are obtained from P2 and $t_{min}$, where $t_{min}$ is derived from P1 as follows

```
tmin = (int)T1 − 5
if tmin < 20 then tmin = 20
tmax = tmin + 9
if tmax > 143 then
    tmax = 143
    tmin = tmax − 9
end
```

Now T2 is obtained from $$(int)T_2=(P2+2)/3-1+t_{min}$$

$$frac=P2-2-((P2+2)/3-1)*3$$

The adaptive codebook vector v(n) is found by interpolating the past excitation u(n) (at the pitch delay) using Eq. (40).

III.4.1.3 Decoding of the Fixed Codebook Vector

The received fixed codebook index C is used to extract the positions of the excitation pulses. The pulse signs are obtained from S. Once the pulse positions and signs are decoded the fixed codebook vector c(n), can be constructed. If the integer part of the pitch delay, T, is less than the subframe size 40, the pitch enhancement procedure is applied which modifies c(n) according to Eq. (48).

III.4.1.4 Decoding of the Adaptive and Fixed Codebook Gains

The received gain codebook index gives the adaptive codebook gain $\hat{g}_p$ and the fixed codebook gain correction factor $\hat{\gamma}$. This procedure is described in detail in Subsection III.3.9. The estimated fixed codebook gain $g'_c$ is found using Eq. (70). The fixed codebook vector is obtained from the product of the quantized gain correction factor with this predicted gain (Eq. (64)). The adaptive codebook gain is reconstructed using Eq. (72).

III.4.1.5 Computation of the Parity Bit

Before the speech is reconstructed, the parity bit is recomputed from the adaptive codebook delay (Subsection III.3.7.2). If this bit is not identical to the transmitted parity bit P0, it is likely that bit errors occurred during transmission and the error concealment procedure of Subsection III.4.3 is used.

III.4.1.6 Computing the Reconstructed Speech

The excitation u(n) at the input of the synthesis filter (see Eq. (74)) is input to the LP synthesis filter. The reconstructed speech for the subframe is given by $$\hat{s}(n) = u(n) - \sum_{i=1}^{10} \hat{a}_i \hat{s}(n-i), \quad n = 0, \ldots, 39. \tag{76}$$

where $\hat{a}_i$ are the interpolated LP filter coefficients.

The reconstructed speech $\hat{s}(n)$ is then processed by a post processor which is described in the next section.

III.4.2 Post-Processing

Post-processing consists of three functions: adaptive postfiltering, high-pass filtering, and signal up-scaling. The adaptive postfilter is the cascade of three filters: a pitch postfilter $H_p(z)$, a short-term postfilter $H_f(z)$, and a tilt compensation filter $H_t(z)$, followed by an adaptive gain control procedure. The postfilter is updated every subframe of 5 ms. The postfiltering process is organized as follows. First, the synthesis speech $\hat{s}(n)$ is inverse filtered through $\hat{A}(z/\gamma_n)$ to produce the residual signal $\hat{r}(n)$. The signal $\hat{r}(n)$ is used to compute the pitch delay T and gain $g_{pit}$. The signal $\hat{r}(n)$ is filtered through the pitch postfilter $H_p(z)$ to produce the signal r'(n) which, in its turn, is filtered by the synthesis filter $1/[g_f\hat{A}(z/\gamma_d)]$. Finally, the signal at the output of the synthesis filter $1/[g_f\hat{A}(z/\gamma_d)]$ is passed to the tilt compensation filter $H_t(z)$ resulting in the postfiltered synthesis speech signal sf(n). Adaptive gain controle is then applied between sf(n) and $\hat{s}(n)$ resulting in the signal sf'(n). The high-pass filtering and scaling operation operate on the post filtered signal sf'(n).

III.4.2.1 Pitch Postfilter

The pitch, or harmonic, postfilter is given by $$H_p(z) = \frac{1}{1+g_0}\left(1 + g_0 z^{-T}\right), \tag{77}$$

where T is the pitch delay and go is a gain factor given by $$g_0 = \gamma_p g_{pit}, \tag{78}$$

where $g_{pit}$ is the pitch gain. Both the pitch delay and gain are determined from the decoder output signal. Note that $g_{pit}$ is bounded by 1, and it is set to zero if the pitch prediction gain is less that 3 dB. The factor $\gamma_p$ controls the amount of harmonic postfiltering and has the value $\gamma_p$=0.5. The pitch delay and gain are computed from the residual signal $\hat{r}(n)$ obtained by filtering the speech $\hat{s}(n)$ through $\hat{A}(z/\gamma_n)$, which is the numerator of the short-term postfilter (see Subsection III.4.2.2)

$$\hat{r}(n) = \hat{s}(n) + \sum_{i=1}^{10} \gamma_n^i \hat{a}_i \hat{s}(n-i). \tag{79}$$

The pitch delay is computed using a two pass procedure. The first pass selects the best integer in the range $[T_1-1, T_1+1]$, where $T_1$ is the integer part of the (transmitted) pitch delay in the first subframe. The best integer delay is the one that maximizes the correlation $$R(k) = \sum_{n=0}^{39} \hat{r}(n)\hat{r}(n-k). \tag{80}$$

The second pass chooses the best fractional delay T with resolution ⅛ around $T_0$. This is done by finding the delay with the highest normalized correlation.

$$R'(k)=\frac{\sum_{n=0}^{39}\hat{r}(n)\hat{r}_k(n)}{\sqrt{\sum_{n=0}^{39}\hat{r}_k(n)\hat{r}_k(n)}}, \quad (81)$$

where $\hat{r}(n)$ is the residual signal at delay k. Once the optimal delay T is found, the corresponding correlation value is compared against a threshold. If R'(T)<0.5 then the harmonic postfilter is disabled by setting $g_{pit}=0$. Otherwise the value of $g_{pit}$ is computed from:

$$g_{pit}=\frac{\sum_{n=0}^{39}\hat{r}(n)\hat{r}_k(n)}{\sum_{n=0}^{39}\hat{r}_k(n)\hat{r}_k(n)}, \text{ bounded by } 0 \leq g_{pit} \leq 1.0. \quad (82)$$

The noninteger delayed signal $\hat{r}_k(n)$ is first computed using an interpolation filter d length 33. After the selection of T, $\hat{r}_k(n)$ is recomputed with a longer interpolation filter of length 129. The new signal replaces the previous one only if the longer filter incre.es the value of R'(T).

III.4.2.2 Short-Term Postfilter

The short-term postfilter is given by $$H_f(z)=\frac{1}{g_f}\;\frac{\hat{A}(z/\gamma_n)}{\hat{A}(z/\gamma_d)}=\frac{1}{g_f}\;\frac{1+\sum_{i=1}^{10}\gamma_n^i\hat{a}_i z^{-i}}{1+\sum_{i=1}^{10}\gamma_d^i\hat{a}_i z^{-i}}, \quad (83)$$

where Â(z) is the received quantized LP inverse filter (LP analysis is not done at the decoder), and the factors $\gamma_n$ and $\gamma_d$ control the amount of short-term postfiltering, and are set to $\gamma_n=0.55$, and $\gamma_d=0.7$. The gain term $g_f$ is calculated on the truncated impulse response, $h_f(n)$, d the filter $\hat{A}(z/\gamma_n)/\hat{A}(z/\gamma_d)$ are given by $$g_f=\sum_{n=0}^{19}|h_f(n)|. \quad (84)$$

III.4.2.3 Tilt Compensation

Finally, the filter $H_t(z)$ compensates for the tilt in the short-term postfilter $H_f(z)$ and is given by $$H_t(z)=\frac{1}{g_t}\,(1+\gamma_t k_1 z^{-1}), \quad (85)$$

where $\gamma_t k_1$ is a tilt factor, $k_1$ being the first reflection coefficient calculated on $h_f(n)$ with $$k_1=-\frac{r_h(1)}{r_h(0)};\; r_h(i)=\sum_{j=0}^{19-i}h_f(j)h_f(j+i). \quad (86)$$

The gain term $g_t=1-|\gamma_t k_1|$ compensates for the decreasing effect of $g_f$ in $H_f(z)$. Furthermore, it has been shown that the product filter $H_f(z)H_t(z)$ has generally no gain.

Two values for $\gamma_t$ are used depending on the sign of $k_1$. If $k_1$ is negative, $\gamma_t=0.9$, and if $k_1$ is positive, $\gamma_t=0.2$.

III.4.2.4 Adaptive Gain Control

Adaptive gain control is used to compensate for gain differences between the reconstructed speech signal $\hat{s}(n)$ and the postfiltered signal sf(n). The gain scaling factor G for the present subframe is computed by $$G=\frac{\sum_{n=0}^{39}|\hat{s}(n)|}{\sum_{n=0}^{39}|sf(n)|}. \quad (87)$$

The gain-scaled postfiltered signal sf'(n) is given by $$sf'(n)=g(n)sf(n),\; n=0, \ldots, 39, \quad (88)$$

where g(n) is updated on a sample-by-sample basis and given by $$g(n)=0.85g(n-1)+0.15G,\; n=0, \ldots, 39. \quad (89)$$

The initial value of g(−1)=1.0.

III.4.2.5 High-pass Filtering and Up-Scaling

A high-pass filter at a cutoff frequency of 100 Hz is applied to the reconstructed and postfiltered speech sf'(n). The filter is given by $$H_{h2}(z)=\frac{0.93980581-1.8795834z^{-1}+0.93980581z^{-2}}{1-1.9330735z^{-1}+0.93589199z^{-2}}. \quad (90)$$

Up-scaling consists of multiplying the high-pass filtered output by a factor 2 to retrieve the input signal level.

III.4.3 Concealment of Frame Erasures and Parity Errors

An error concealment procedure has been incorporated in the decoder to reduce the degradations in the reconstructed speech because of frame erasures or random errors in the bitstream. This error concealment process is functional when either i) the frame of coder parameters (corresponding to a 10 ms frame) has been identified as being erased, or ii) a checksum error occurs on the parity bit for the pitch delay index P1. The latter could occur when the bitstream has been corrupted by random bit errors.

If a parity error occurs on P1, the delay value $T_1$ is set to the value of the delay of the previous frame. The value of $T_2$ is derived with the procedure outlined in Subsection III.4.1.2, using this new value of $T_1$. If consecutive parity errors occur, the previous value of $T_1$, incremented by 1, is used.

The mechanism for detecting frame erasures is not defined in the Recommendation, and will depend on the application. The concealment strategy has to reconstruct the current frame, based on previously received information. The method used replaces the missing excitation signal with one of similar characteristics, while gradually decaying its energy. This is done by using a voicing classifier based on the long-term prediction gain, which is computed as part of the long-term postfilter analysis. The pitch postfilter (see Subsection III.4.2.1) finds the long-term predictor for which the prediction gain is more than 3 dB. This is done by setting a threshold of 0.5 on the normalized correlation R'(k) (Eq. (81)). For the error concealment process, these frames will be classified as periodic. Otherwise the frame is declared nonperiodic. An erased frame inherits its class from the preceding (reconstructed) speech frame. Note that the voicing classification is continuously updated based on this reconstructed speech signal. Hence, for many consecutive erased frames the classification might change. Typically, this only happens if the original classification was periodic.

The specific steps taken for an erased frame are:

1. repetition of the LP filter parameters, 2. attenuation of adaptive and fixed codebook gains,
3. attenuation of the memory of the gain predictor,
4. generation of the replacement excitation.

III.4.3.1 Repetition of LP Filter Parameters

The LP parameters of the last good frame are used. The states of the LSF predictor contain the values of the received codewords $l_i$. Since the current codeword is not available it is computed from the repeated LSF parameters $\hat{\omega}_i$ and the predictor memory from $$l_i = \left[ \hat{\omega}_i^{(m)} - \sum_{k=1}^{4} m_i^k l_i^{(m-k)} \right] / \left( 1 - \sum_{k=1}^{4} m_i^k \right), i = 1, \ldots, 10. \quad (91)$$

III.4.3.2 Attenuation of Adaptive and Fixed Codebook Gains

An attenuated version of the previous fixed codebook gain is used.

$$g_c^{(m)} = 0.98 g_c^{(m-1)}. \quad (92)$$

The same is done for the adaptive codebook gain. In addition a clipping operation is used to keep its value below 0.9.

$$g_p^{(m)} = 0.9 g_p^{(m-1)} \text{ and } g_p^{(m)} < 0.9. \quad (93)$$

III.4.3.3 Attenuation of the Memory of the Gain Predictor

The gain predictor uses the energy of previously selected codebooks. To allow for a smooth continuation of the coder once good frames are received, the memory of the gain predictor is updated with an attenuated version of the codebook energy. The value of $\hat{R}^{(m)}$ for the current subframe n is set to the averaged quantized gain prediction error, attenuated by 4 dB.

$$\hat{R}^{(m)} = \left( 0.25 \sum_{i=1}^{4} \hat{R}^{(m-i)} \right) - 4.0 \text{ and } \hat{R}^{(m)} \geqq -14. \quad (94)$$

4.3.4 Generation of the Replacement Excitation

The excitation used depends on the periodicity classification. If the last correctly received frame was classified as periodic, the current frame is considered to be periodic as well. In that case only the adaptive codebook is used, and the fixed codebook contribution is set to zero. The pitch delay is based on the last correctly received pitch delay and is repeated for each successive frame. To avoid excessive periodicity the delay is increased by one for each next subframe but bounded by 143. The adaptive codebook gain is based on an attenuated value according to Eq. (93).

If the last correctly received frame was classified as nonperiodic, the current frame is considered to be nonperiodic as well, and the adaptive codebook contribution is set to zero. The fixed codebook contribution is generated by randomly selecting a codebook index and sign index. The random generator is based on the function $$\text{seed} = \text{seed} * 31821 + 13849, \quad (95)$$

with the initial seed value of 21845. The random codebook index is derived from the 13 least significant bits of the next random number. The random sign is derived from the 4 least significant bits of the next random number. The fixed codebook gain is attenuated according to Eq. (92).

III.5 BIT-EXACT DESCRIPTION OF THE CS-ACELP CODER

ANSI C code simulating the CS-ACELP coder in 16 bit fixed-point is available from ITU-T. The following sections summarize the use of this simulation code, and how the software is organized.

III.5.1 Use of the Simulation Software

The C code consists of two main programs coder. c, which simulates the encoder, and decoder. c, which simulates the decoder. The encoder is run as follows:

```
coder inputfile bstreamfile
```

The inputfile and outputfile are sampled data files containing 16-bit PCM signals. The bitstream file contains 81 16-bit words, where the first word can be used to indicate frame erasure, and the remaining 80 words contain one bit each. The decoder takes this bitstream file and produces a post-filtered output file containing a 16-bit PCM signal.

```
decoder bstreamfile outputfile
```

III.5.2 Organization of the Simulation Software

In the fixed-point ANSI C simulation, only two types of fixed-point data are used as is shown in Table 10. To facilitate the implementation of the simulation code, loop indices, Boolean values and flags use the type Flag, which would be either 16 bit or 32 bits depending on the target platform.

TABLE 10

Data types used in ANSI C simulation.

| Type | Max. value | Min. value | Description |
|---|---|---|---|
| Word16 | 0x7fff | 0x8000 | signed 2's complement 16 bit word |
| Word32 | 0x7fffffffL | 0x80000000L | signed 2's complement 32 bit word |

All the computations are done using a predefined set of basic operators. The description of these operators is given in Table 11. The tables used by the simulation coder are summarized in Table 12. These main programs use a library of routines that are summarized in Tables 13, 14, and 15.

TABLE 11

Basic operations used in ANSI C simulation.

| Operation | Description |
|---|---|
| Word16 sature(Word32 L_var1) | Limit to 16 bits |
| Word16 add(Word16 var1, Word16 var2) | Short addition |
| Word16 sub(Word16 var1, Word16 var2) | Short subtraction |
| Word16 abs_s(Word16 var1) | Short abs |

TABLE 11-continued

Basic operations used in ANSI C simulation.

| Operation | Description |
|---|---|
| Word16 shl(Word16 var1, Word16 var2) | Short shift left |
| Word16 shr(Word16 var1, Word16 var2) | Short shift right |
| Word16 mult(Word16 var1, Word16 var2) | Short multiplication |
| Word32 L_mult(Word16 var1, Word16 var2) | Long multiplication |
| Word16 negate(Word16 var1) | Short negate |
| Word16 extract_h(Word32 L_var1) | Extract high |
| Word16 extract_l(Word32 L_var1) | Extract low |
| Word16 round(Word32 L_var1) | Round |
| Word32 L_mac(Word32 L_var3, Word16 var1, Word16 var2) | Mac |
| Word32 L_msu(Word32 L_var3, Word16 var1, Word16 var2) | Msu |
| Word32 L_macNs(Word32 L_var3, Word16 var1, Word16 var2) | Mac without sat |
| Word32 L_msuNs(Word32 L_var3, Word16 var1, Word16 var2) | Msu without sat |
| Word32 L_add(Word32 L_var1, Word32 L_var2) | Long addition |
| Word32 L_sub(Word32 L_var1, Word32 L_var2) | Long subtraction |
| Word32 L_add_c(Word32 L_var1, Word32 L_var2) | Long add with c |
| Word32 L_sub_c(Word32 L_var1, Word32 L_var2) | Long sub with c |
| Word32 L_negate(Word32 L_var1) | Long negate |
| Word16 mult_r(Word16 var1, Word16 var2) | Multiplication with round |
| Word32 L_shl(Word32 L_var1, Word16 var2) | Long shift left |
| Word32 L_shr(Word32 L_var1, Word16 var2) | Long shift right |
| Word16 shr_r(Word16 var1, Word16 var2) | Shift right with round |
| Word16 mac_r(Word32 L_var3, Word16 var1, Word16 var2) | Mac with rounding |
| Word16 msu_r(Word32 L_var3, Word16 var1, Word16 var2) | Msu with rounding |
| Word32 L_deposit_h(Word16 var1) | 16 bit var1 - MSB |
| Word32 L_deposit_l(Word16 var1) | 16 bit var1 - LSB |
| Word32 L_shr_r(Word32 L_var1, Word16 var2) | Long shift right with round |
| Word32 L_abs(Word32L_var1) | Long abs |
| Word32 L_sat(Word32 L_var1) | Long saturation |
| Word16 norm_s(Word16 var1) | Short norm |
| Word16 div_s(Word16 var1, Word16 var2) | Short division |
| Word16 norm_l(Word32 L_var1) | Long norm |

TABLE 12

Summary of tables.

| File | Table name | Size | Description |
|---|---|---|---|
| tab_hup.c | tab_hup_s | 28 | upsampling filter for postfilter |
| tab_hup.c | tab_hup_l | 112 | upsampling filter for postfilter |
| inter_3.c | inter_3 | 13 | FIR filter for interpolating the correlation |
| pred_lt3.c | inter_3 | 31 | FIR filter for interpolating past excitation |
| lspcb.tab | lspcb1 | 128 × 10 | LSP quantizer (first stage) |
| lspcb.tab | lspcb2 | 32 × 10 | LSP quantizer (second stage) |
| lspcb.tab | fg | 2 × 4 × 10 | MA predictors in LSP VQ |
| lspcb.tab | fg_sum | 2 × 10 | used in LSP VQ |
| lspcb.tab | fg_sum_inv | 2 × 10 | used in LSP VQ |
| qua_gain.tab | gbk1 | 8 × 2 | codebook GA in gain VQ |
| qua_gain.tab | gbk2 | 16 × 2 | codebook GB in gain VQ |
| qua_gain.tab | map1 | 8 | used in gain VQ |
| qua_gain.tab | imap1 | 8 | used in gain VQ |
| qua_gain.tab | map2 | 16 | used in gain VQ |
| qua_gain.tab | ima21 | 16 | used in gain VQ |
| window.tab | window | 240 | LP analysis window |
| lag_wind.tab | lag_h | 10 | lag window for bandwidth expansion (high part) |
| lag_wind.tab | lag_l | 10 | lag window for bandwidth expansion (low part) |
| grid.tab | grid | 61 | grid points in LP to LSP conversion |
| inv_sqrt.tab | table | 49 | lookup table in inverse square root computation |
| log2.tab | table | 33 | lookup table in base 2 logarithm computation |
| lsp_lsf.tab | table | 65 | lookup table in LSF to LSP conversion and vice versa |
| lsp_lsf.tab | slope | 64 | line Slopes in LSP to LSF conversion |
| pow2.tab | table | 33 | lookup table in 2 computation |
| acelp.h | | | prototypes for fixed codebook search |
| ld8k.h | | | prototypes and constants |
| typedef.h | | | type definitions |

TABLE 13

Summary of encoder specific routines.

| Filename | Description |
|---|---|
| acelp_co.c | Search fixed codebook |
| autocorr.c | Compute autocorrelation for LP analysis |
| az_lsp.c | compute LSPs from LP coefficients |
| cod_ld8k.c | encoder routine |
| convolve.c | convolution operation |
| corr_xy2.c | compute correlation terms for gain quantization |
| enc_lag3.c | encode adaptive codebook index |
| g_pitch.c | compute adaptive codebook gain |
| gainpred.c | gain predictor |
| int_lpc.c | interpolation of LSP |
| inter_3.c | fractional delay interpolation |
| lag_wind.c | lag-windowing |
| levinson.c | levinson recursion |
| lspenc.c | LSP encoding routine |
| lspgetq.c | LSP quantizer |
| lspgett.c | compute LSP quantizer distortion |
| lspgetw.c | compute LSP weights |
| lsplast.c | select LSP MA predictor |
| lsppre.c | pre-selection first LSP codebook |

TABLE 13-continued

| Summary of encoder specific routines. | |
|---|---|
| Filename | Description |
| lspprev.c | LSP predictor routines |
| lspsel1.c | first stage LSP quantizer |
| lspsel2.c | second stage LSP quantizer |
| lspstab.c | stability test for LSP quantizer |
| pitch_fr.c | closed-loop pitch search |
| pitch_ol.c | open-loop pitch search |
| pre_proc.c | pre-processing (HP filtering and scaling) |
| pwf.c | computation of perceptual weighting coefficients |
| qua_gain.c | gain quantizer |
| qua_lsp.c | LSP quantizer |
| relspwe.c | LSP quantizer |

TABLE 14

| Summary of decoder specific routines. | |
|---|---|
| Filename | Description |
| d_lsp.c | decode LP information |
| de_acelp.c | decode algebraic codebook |
| dec_gain.c | decode gains |
| dec_lag3.c | decode adaptive codebook index |
| dec_ld8k.c | decoder routine |
| lspdec.c | LSP decoding routine |
| post_pro.c | post processing (HP filtering and scaling) |
| pred_lt3.c | generation of adaptive codebook |
| pst.c | postfilter routines |

TABLE 15

| Summary of general routines. | |
|---|---|
| Filename | Description |
| basicop2.c | basic operators |
| bits.c | bit manipulation routines |
| gainpred.c | gain predictor |
| int_lpc.c | interpolation of LSP |
| inter_3.c | fractional delay interpolation |
| lsp_az.c | compute LP from LSP coefficients |
| lsp_lsf.c | conversion between LSP and LSF |
| lsp_lsf2.c | high precision conversion between LSP and LSF |
| lspexp.c | expansion of LSP coefficients |
| lspstab.c | stability test for LSP quantizer |
| p_parity.c | compute pitch parity |
| pred_lt3.c | generation of adaptive codebook |
| random.c | random generator |
| residu.c | compute residual signal |

TABLE 15-continued

| Summary of general routines. | |
|---|---|
| Filename | Description |
| syn_filt.c | synthesis filter |
| weight_a.c | bandwidth expansion LP coefficients |

The invention claimed is:

1. A method for use in a speech decoder which falls to receive reliably at least a portion of each of first and second consecutive frames of compressed speech information, the speech decoder including a codebook memory for supplying a vector signal in response to a signal representing pitch-period information, the vector signal for use in generating a decoded speech signal, the method comprising:

storing a signal having a value representing pitch-period information corresponding to said first frame; and incrementing said value of said signal for use in said second frame, such that said codebook memory supplies a vector signal in response to the incremented value of said signal.

2. The method of claim 1 wherein the value of the signal representing pitch-period information is in units of samples of a signal representing speech information.

3. The method of claim 2 wherein the step of incrementing comprises incrementing a number of samples representing a pitch-period.

4. The method of claim 1 wherein the signal value representing pitch-period informtion corresponding to said first frame is equal to a value of pitch-period information received in a frame in which no failure to receive information has occurred.

5. A method for use in a speech decoder which fails to receive reliably at least a portion of a frame of compressed speech information for first and second consecutive frames, the speech decoder including an adaptive codebook memory for supplying codebook vector signals for use in generating a decoded speech signal in response to a signal representing pitch-period information, the method comprising:

storing a signal having a value representing pitch-period information corresponding to said first frame; and if said stored value does not exceed a threshold, incrementing said value of said signal for use in said second frame.

* * * * *

US005699485C1

(12) EX PARTE REEXAMINATION CERTIFICATE (8275th)

United States Patent

Shoham

(10) Number: US 5,699,485 C1

(45) Certificate Issued: May 31, 2011

(54) PITCH DELAY MODIFICATION DURING FRAME ERASURES

(75) Inventor: Yair Shoham, Watchung, NJ (US)

(73) Assignee: Research in Motion Limited, Waterloo, Ontario (CA)

Reexamination Request:
No. 90/010,581, Jun. 22, 2009

Reexamination Certificate for:
Patent No.: 5,699,485
Issued: Dec. 16, 1997
Appl. No.: 08/482,709
Filed: Jun. 7, 1995

(51) Int. Cl.
*G10L 19/00* (2006.01)
*G10L 11/04* (2006.01)
*G10L 11/00* (2006.01)

(52) U.S. Cl. ........................ 704/223; 704/219; 704/220; 704/222; 704/E19.003; 341/94; 714/747

(58) Field of Classification Search ........................ None
See application file for complete search history.

(56) References Cited

U.S. PATENT DOCUMENTS 4,903,301 A 2/1990 Kondo et al.
4,963,034 A 10/1990 Cuperman et al.
4,975,957 A 12/1990 Ichikawa et al.
5,029,211 A 7/1991 Ozawa
5,073,940 A 12/1991 Zinser et al.
5,163,110 A 11/1992 Arthur et al.
5,253,269 A 10/1993 Gerson et al.
5,305,332 A 4/1994 Ozawa
5,339,384 A 8/1994 Chen
5,359,696 A 10/1994 Gerson et al.
5,450,449 A 9/1995 Kroon
5,495,555 A 2/1996 Swaminathan
5,526,366 A 6/1996 Jarvinen et al.
5,550,543 A 8/1996 Chen et al.
5,572,622 A 11/1996 Wigren et al.
5,574,823 A 11/1996 Hassanein et al.
5,574,825 A 11/1996 Chen et al.
5,596,676 A 1/1997 Swaminathan et al.
5,615,298 A 3/1997 Chen
5,699,478 A 12/1997 Nahumi
5,704,002 A 12/1997 Massaloux
5,717,822 A 2/1998 Chen
5,751,903 A 5/1998 Swaminathan et al.
5,778,338 A 7/1998 Jacobs et al.
5,781,880 A 7/1998 Su
5,806,037 A 9/1998 Sogo
5,884,010 A 3/1999 Chen et al.
5,899,968 A 5/1999 Navarro et al.
5,926,786 A 7/1999 McDonough et al.

FOREIGN PATENT DOCUMENTS

EP 0 459 358 A2 12/1991
JP 05-113789 5/1993
WO WO 94/29982 12/1994

OTHER PUBLICATIONS

Atungsiri et al., "Effective Lost Speech Frame Reconstruction for CELP Coders," Proc. of EUROSPEECH Conference, vol. 2, Sep. 1991 (4 pages).

Goodman et al., "Waveform Substitution Techniques for Recovering Missing Speech Segments in Packet Voice Communications," IEEE Transactions on Acoustics, Speech, and Signal Processing, vol. ASSP–34, No. 6, Dec. 1986 (4 pages).

(Continued)

*Primary Examiner*—Charles Craver

(57) ABSTRACT

In a speech decoder which experiences frame erasure, the pitch delay associated with the first of consecutive erased frames is incremented. The incremented value is used as the pitch delay for the second of consecutive erased frames. Pitch delay associated with the first of consecutive erased frames may correspond to the last correctly received pitch delay information from a speech encoder (associated with a non-erased frame), or it may itself be the result of an increment added to a still previous value of pitch delay (associated with a still previous erased frame).

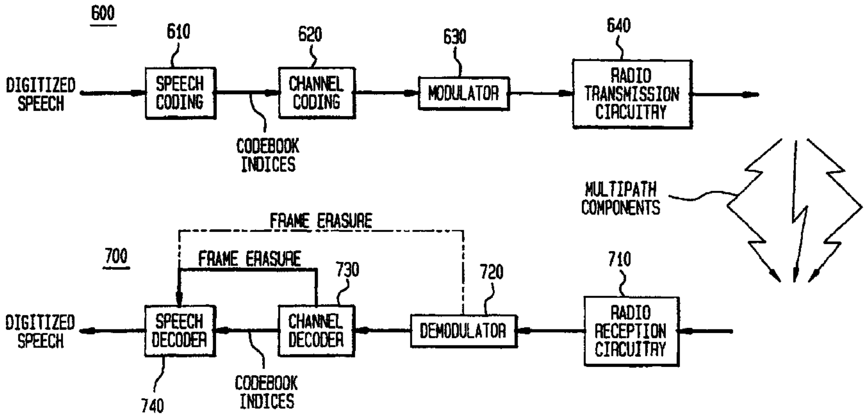

OTHER PUBLICATIONS

Allen Gerhso, "Advances in Speech and Audio Compression," Proceedings of the IEEE, vol. 82, No. 6, Jun. 1994 (19 pages).

Gerson et al., "Vector Sum Excited Linear Prediction (VSELP) Speech Coding at 4.8 kbps," International Mobile Satellite Conference, Ottawa, 1990 (6 pages).

Gerson et al., "Techniques for Improving the Performance of CELP–Type Speech Coders," IEEE Journal on Selected Areas in Communications, vol. 10, No. 5, Jun. 1992 (8 pages).

Akamine et al., "Improvement of ADP–CELP Speech Coding at 4 Kbit/s," IEEE, 1991 (5 pages).

P. Kabal, "Code Excited Linear Prediction Coding of Speech at 4.8 kb/s," INRS—Télécommunications No. 87–36, Jul. 1987 (18 pages).

Kleijn et al., "An Efficient Stochastically Excited Linear Predictive Coding Algorithm for High Quality Low Bit Rate Transmission of Speech," Speech Communication 7, 1998 (12 pages).

Menez et al., "Adaptive Code Excited Linear Predictive Coder (ACELPC)," IEEE, 1989 (4 pages).

Hermansson et al., "A Speech Codec for Cellular Radio at a Gross Bit Rate of 11.4 kb/s," IEEE, 1991 (4 pages).

Taniguchi et al., "Pitch Sharpening for Perceptually Improved CELP, and the Sparse–Delta Codebook for Reduced Computation," IEEE, 1991 (4 pages).

Wang et al., "Improved Excitation for Phonetically–Segmented VXC Speech Coding Below 4 Kb/s," IEEE, 1990 (5 pages).

Miki et al., "Pitch Synchronous Innovation CELP (PSI–CELP)," Third European Conference on Speech Communication and Technology, Sep. 22–25, 1993 (4 pages).

Salami et al., "A Toll Quality 8 Kb/s Speech Codec for the Personal Communications System (PCS)," IEEE, 1994 (9 pages).

Defendant Motorola, Inc.'s Answer and Counterclaims; Demand for Jury Trial filed Jan. 9, 2009 from *Research in Motion Limited, Research in Motion Corporation, and TIP Communications, LLC* v. *Motorola, Inc.* Civil Action No. 3:08–CV–0284–G (N,D. Tex.).

Motorola, Inc.'s First Supplemental Responses to First Set of Interrogatories (No. 14) filed Jun. 12, 2009 from *Research in Motion Limited, Research in Motion Corporation, and TIP Communications, LLC* v. *Motorola, Inc.* Civil Action No. 3:08–CV–0284–G (N.D. Tex.).

Motorola, Inc.'s First Supplemental Responses to First Set of Interrogatories (No. 14) Exhibit C filed Jun. 12, 2009 from *Research in Motion Limited, Research in Motion Corporation, and TIP Communications, LLC* v. *Motorola, Inc.* Civil Action No. 3:08–CV–0284–G (N.D. Tex.).

Defendant Motorola, Inc.'s First Amended Counterclaims; Demand for Jury Trial filed Oct. 14, 2009 from *Research in Motion Limited, Research in Motion Corporation, and TIP Communications, LLC* v. *Motorola, Inc.* Civil Action No. 3:08–CV–0284–G (N.D. Tex.).

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 5 is confirmed.

Claims 1 and 4 are determined to be patentable as amended.

Claims 2 and 3, dependent on an amended claim, are determined to be patentable.

New claims 6-8 are added and determined to be patentable.

1. A method for use in a speech decoder which [falls] *fails* to receive reliably at least a portion of each of first and second consecutive frames of compressed speech information, the speech decoder including a codebook memory for supplying a vector signal in response to a signal representing pitch-period information, the vector signal for use in generating a decoded speech signal, the method comprising:

storing a signal having a value representing pitch-period information corresponding to said first frame; and incrementing said value of said signal for use in said second frame, such that said codebook memory supplies a vector signal in response to the incremented value of said signal.

4. The method of claim 1 wherein the signal value representing pitch-period [informtion] *information* corresponding to said first frame is equal to a value of pitch-period information received in a frame in which no failure to receive information has occured.

*6. The method of claim 1, wherein the speech decoder receives at least two codebook indexes from an encoder for non-erased frames.*

*7. The method of claim 6, wherein the speech decoder further receives parameters from an encoder for non-erased frames representing linear prediction coefficients and at least one value indicative of a gain.*

*8. The method of claim 1, wherein*

*(i) the speech decoder receives and correctly decodes a previous frame immediately preceding the first frame;*

*(ii) the previous frame has associated pitch-period information; and*

*(iii) the value for the first frame is based on the previous frame pitch-period information.*

* * * * *